United States Patent
Yamajo et al.

(10) Patent No.: US 12,231,791 B2
(45) Date of Patent: Feb. 18, 2025

(54) SOLID-STATE IMAGING DEVICE, METHOD FOR DRIVING THE SAME, AND ELECTRONIC DEVICE

(71) Applicant: Sony Semiconductor Solutions Corporation, Kanagawa (JP)

(72) Inventors: Hiroaki Yamajo, Kanagawa (JP); Masayuki Tachi, Kanagawa (JP); Kazuhito Kobayashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 248 days.

(21) Appl. No.: 17/623,017

(22) PCT Filed: Jun. 18, 2020

(86) PCT No.: PCT/JP2020/023986
§ 371 (c)(1),
(2) Date: Dec. 27, 2021

(87) PCT Pub. No.: WO2021/002213
PCT Pub. Date: Jan. 7, 2021

(65) Prior Publication Data
US 2022/0272292 A1    Aug. 25, 2022

(30) Foreign Application Priority Data
Jul. 2, 2019   (JP) .................... 2019-123705

(51) Int. Cl.
*H04N 25/704* (2023.01)
*H04N 25/13* (2023.01)
*H04N 25/75* (2023.01)

(52) U.S. Cl.
CPC ......... *H04N 25/704* (2023.01); *H04N 25/134* (2023.01); *H04N 25/75* (2023.01)

(58) Field of Classification Search
CPC .... H04N 25/704; H04N 25/134; H04N 25/75; H04N 23/12; H04N 25/74; H04N 25/40;
(Continued)

(56) References Cited

U.S. PATENT DOCUMENTS

2013/0057744 A1* 3/2013 Minagawa ............. H04N 25/70
348/311
2013/0222553 A1* 8/2013 Tsuchita ............... H04N 13/218
348/49

(Continued)

FOREIGN PATENT DOCUMENTS

CN          105580352 A      5/2016
JP         2010-239337 A    10/2010
(Continued)

OTHER PUBLICATIONS

International Search Report (PCT/ISA/210), International Application No. PCT/JP2020/023986, dated Sep. 28, 2020.

*Primary Examiner* — Nhan T Tran
(74) *Attorney, Agent, or Firm* — Michael Best & Friedrich LLP

(57) ABSTRACT

Solid-state imaging devices, methods of driving solid-state imaging devices, and electronic devices are disclosed. In one example, a solid-state imaging device includes a pixel array unit in which pixels are two-dimensionally arranged in a matrix. At least some pixel rows include a first signal line configured to transmit a drive signal for driving a first transfer transistor of a first pixel in units of microlenses having a color filter of a first color, a second signal line configured to transmit a drive signal for driving a second transfer transistor of a second pixel different from the first pixel, and a third signal line configured to transmit a drive signal for driving a third transfer transistor of a third pixel in units of microlenses having a color filter of a second color different from the first color.

12 Claims, 27 Drawing Sheets

(58) Field of Classification Search
CPC ........ H04N 25/00; H04N 25/44; H04N 25/76; H04N 25/11; H01L 27/14627
See application file for complete search history.

(56) References Cited

U.S. PATENT DOCUMENTS

| | | | |
|---|---|---|---|
| 2015/0358593 A1* | 12/2015 | Sato | H04N 25/134 |
| | | | 348/280 |
| 2017/0099449 A1* | 4/2017 | Kang | H04N 25/75 |
| 2017/0104942 A1* | 4/2017 | Hirota | H01L 27/14627 |
| 2017/0171470 A1* | 6/2017 | Sakioka | H04N 25/135 |
| 2018/0175087 A1* | 6/2018 | Ishiwata | H04N 25/77 |
| 2019/0019835 A1* | 1/2019 | Tanaka | H01L 27/14647 |
| 2019/0132508 A1* | 5/2019 | Hamano | H04N 23/80 |

FOREIGN PATENT DOCUMENTS

| | | |
|---|---|---|
| JP | 2016-052041 A | 4/2016 |
| JP | 2019-029985 A | 2/2019 |
| WO | 2014/103730 A1 | 7/2014 |
| WO | 2015/151794 A1 | 10/2015 |
| WO | WO-2019026718 A1 | 2/2019 |
| WO | WO-2019035374 A1 | 2/2019 |

\* cited by examiner

SOLID-STATE IMAGING DEVICE, METHOD FOR DRIVING THE SAME, AND ELECTRONIC DEVICE

TECHNICAL FIELD

The present technology relates to a solid-state imaging device, a method of driving the solid-state imaging device, and an electronic device, and more particularly, to a solid-state imaging device, a method of driving the solid-state imaging device, and an electronic device capable of outputting a phase difference signal without lowering a frame rate.

BACKGROUND ART

There is a solid-state imaging device having a structure in which one microlens is arranged for four pixels including 2×2 of two pixels in each of a vertical direction and a horizontal direction, and floating diffusion (FD) is shared by the four pixels (see, for example, Patent Document 1). In the solid-state imaging device having such an arrangement of microlenses, it is possible to detect the phase difference by acquiring the charge accumulated in the photodiode of each pixel in units of two pixels on one side.

CITATION LIST

Patent Document

Patent Document 1: Japanese Patent Application Laid-Open No. 2016-052041

SUMMARY OF THE INVENTION

Problems to be Solved by the Invention

However, in order to detect the phase difference, generally, it is necessary to perform reading of charges of two pixels on one side under the microlens and reading of charges of the remaining two pixels or all four pixels twice, and the frame rate decreases.

The present technology has been made in view of such a situation, and enables output of a phase difference signal without lowering a frame rate.

Solutions to Problems

According to a first aspect of the present technology, a solid-state imaging device includes a pixel array unit in which a plurality of pixels in units of microlenses in which color filters of the same color and one microlens are arranged for a plurality of pixels is two-dimensionally arranged in a matrix, in which at least some pixel rows of the pixel array unit include: a first signal line configured to transmit a drive signal for driving a first transfer transistor of a first pixel in units of microlenses having a color filter of a first color; a second signal line configured to transmit a drive signal for driving a second transfer transistor of a second pixel different from the first pixel in units of microlenses having a color filter of the first color; and a third signal line configured to transmit a drive signal for driving a third transfer transistor of a third pixel in units of microlenses having a color filter of a second color different from the first color.

According to a second aspect of the present technology, a method for driving a solid-state imaging device includes: by the solid-state imaging device including a pixel array unit in which a plurality of pixels in units of microlenses in which color filters of the same color and one microlens are arranged for a plurality of pixels is two-dimensionally arranged in a matrix, and a first signal line to a third signal line in at least some pixel rows of the pixel array unit, driving a first transfer transistor of a first pixel in units of microlenses having a color filter of a first color via the first signal line; driving a second transfer transistor of a second pixel different from the first pixel in units of microlenses having the color filter of the first color via the second signal line; and driving a third transfer transistor of a third pixel in units of microlenses having a color filter of a second color different from the first color via the third signal line.

According to a third aspect of the present technology, an electronic device includes: a solid-state imaging device including a pixel array unit in which a plurality of pixels in units of microlenses in which color filters of the same color and one microlens are arranged for a plurality of pixels is two-dimensionally arranged in a matrix, in which at least some pixel rows of the pixel array unit include: a first signal line configured to transmit a drive signal for driving a first transfer transistor of a first pixel in units of microlenses including a color filter of a first color; a second signal line configured to transmit a drive signal for driving a second transfer transistor of a second pixel different from the first pixel in units of microlenses including a color filter of the first color; and a third signal line configured to transmit a drive signal for driving a third transfer transistor of a third pixel in units of microlenses including a color filter of a second color different from the first color.

In the first to third aspects of the present technology, a pixel array unit in which a plurality of pixels in units of microlenses in which color filters of the same color and one microlens are arranged for a plurality of pixels is two-dimensionally arranged in a matrix is provided, and at least some pixel rows of the pixel array unit includes a first signal line configured to transmit a drive signal for driving a first transfer transistor of a first pixel in units of microlenses including a color filter of a first color, a second signal line configured to transmit a drive signal for driving a second transfer transistor of a second pixel different from the first pixel in units of microlenses including the color filter of the first color, and a third signal line configured to transmit a drive signal for driving a third transfer transistor of a third pixel in units of microlenses including a color filter of a second color different from the first color.

According to the second aspect of the present technology, a solid-state imaging device including: a pixel array unit in which a plurality of pixels in units of microlenses in which color filters of the same color and one microlens are arranged for a plurality of pixels is two-dimensionally arranged in a matrix; and a first signal line to a third signal line in at least some pixel rows of the pixel array unit, in which a first transfer transistor of a first pixel in units of microlenses having a color filter of a first color is driven via the first signal line, a second transfer transistor of a second pixel different from the first pixel is driven via the second signal line in units of microlenses having a color filter of the first color, and a third transfer transistor of a third pixel in units of microlenses having a color filter of a second color different from the first color is driven via the third signal line.

The solid-state imaging device and the electronic device may be independent devices or modules incorporated in other devices.

MODE FOR CARRYING OUT THE INVENTION

Modes for carrying out the present technology (hereinafter, referred to as an embodiment) will be described below. Note that the description will be given in the following order.

1. Schematic Configuration Example of Solid-State Imaging Device
2. Cross-Sectional Configuration Diagram of Pixel
3. Basic Circuit Example of Shared Pixel Structure
4. Arrangement Example of Phase Difference Pixel
5. Configuration Example of Column AD Conversion Unit
6. Another Arrangement Example of Phase Difference Pixel
7. Configuration Example of Vertically Split Phase Difference Pixel
8. Signal Output of Solid-State Imaging Device
9. Others
10. Application Example to Electronic Device
11. Application Example to Endoscopic Surgery System
12. Application Example to Moving Object

1. Schematic Configuration Example of Solid-State Imaging Device

Figure 1:
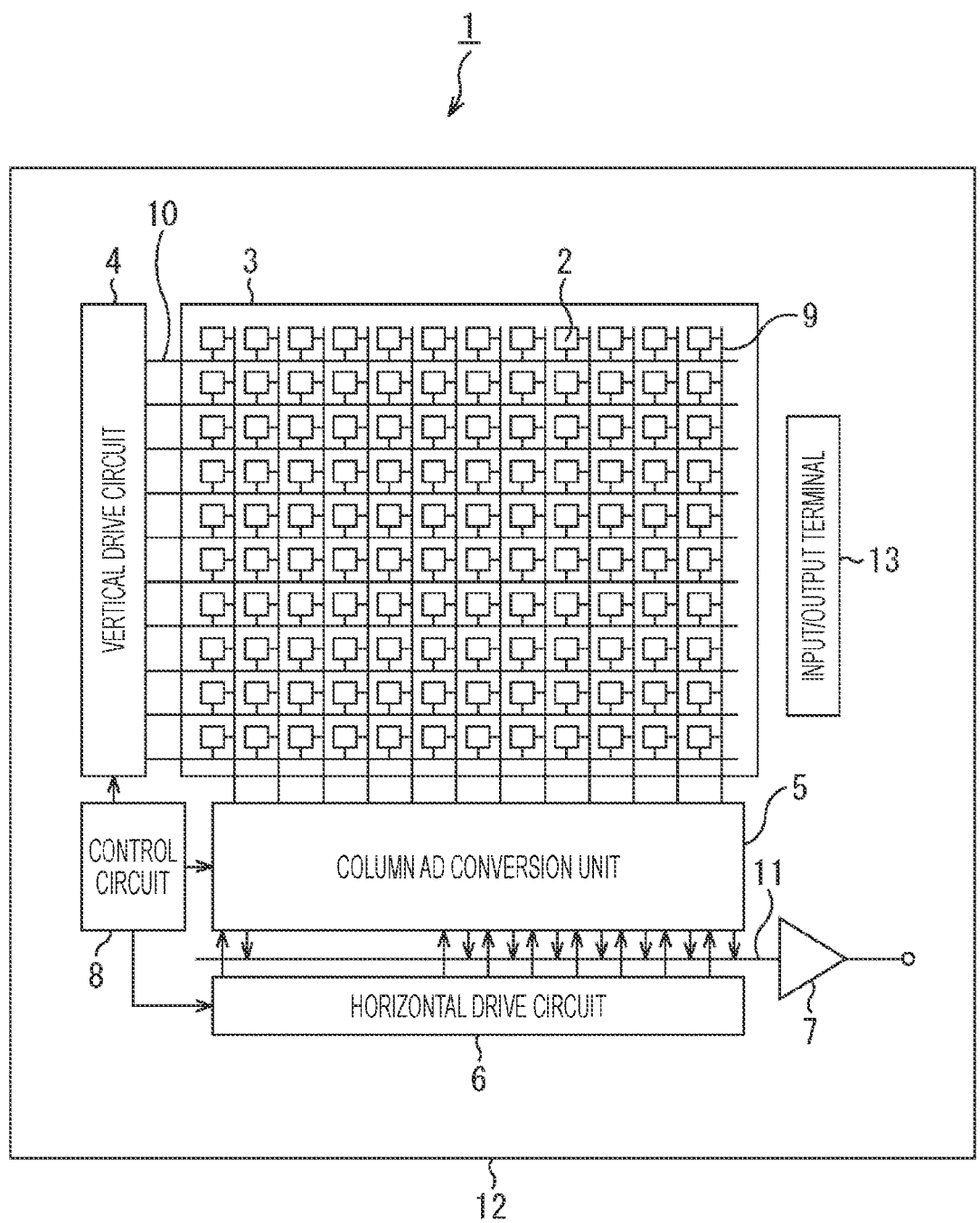
FIG. 1 is a diagram illustrating a schematic configuration of a solid-state imaging device to which the present technology is applied.

FIG. 1 illustrates a schematic configuration of a solid-state imaging device to which the present technology is applied.

A solid-state imaging device 1 of FIG. 1 includes a pixel array unit 3 in which pixels 2 are two-dimensionally arranged in a matrix on a semiconductor substrate 12 using, for example, silicon (Si) as a semiconductor, and a peripheral circuit unit around the pixel array unit 3. The peripheral circuit unit includes a vertical drive circuit 4, a column AD conversion unit 5, a horizontal drive circuit 6, an output circuit 7, a control circuit 8, and the like.

The pixel 2 includes a photodiode as a photoelectric conversion element and a plurality of pixel transistors. The plurality of pixel transistors includes, for example, four MOS transistors of a transfer transistor, a selection transistor, a reset transistor, and an amplification transistor.

Furthermore, the pixel 2 may have a shared pixel structure. This shared pixel structure includes a plurality of photodiodes, a plurality of transfer transistors, one shared floating diffusion (floating diffusion region), and one shared other pixel transistor. That is, in the shared pixel structure, a photodiode and a transfer transistor constituting a plurality of unit pixels are configured to share each other pixel transistor.

The control circuit 8 receives an input clock and data instructing an operation mode and the like, and outputs data such as internal information of the solid-state imaging device 1. That is, the control circuit 8 generates a clock signal or a control signal serving as a reference of operations of the vertical drive circuit 4, the column AD conversion unit 5, the horizontal drive circuit 6, and the like on the basis of a vertical synchronization signal, a horizontal synchronization signal, and a master clock. Then, the control circuit 8 outputs the generated clock signal and control signal to the vertical drive circuit 4, the column AD conversion unit 5, the horizontal drive circuit 6, and the like.

The vertical drive circuit 4 includes, for example, a shift register, selects a predetermined pixel drive wiring 10, supplies a pulse for driving the pixels 2 to the selected pixel drive wiring 10, and drives the pixels 2 in units of rows. That is, the vertical drive circuit 4 sequentially selects and scans each pixel 2 of the pixel array unit 3 in a vertical direction in units of rows, and supplies a pixel signal based on a signal charge generated according to the amount of received light in the photoelectric conversion unit of each pixel 2 to the column AD conversion unit 5 through the vertical signal line 9.

The column AD conversion unit 5 converts an analog pixel signal output from each two-dimensionally arranged pixel 2 into a digital pixel signal, and holds the digital pixel signal for a certain period of time. As will be described later with reference to FIG. 10, the ADC 52 is arranged for each of one or more pixel columns in the column AD conversion unit 5.

The horizontal drive circuit 6 includes, for example, a shift register, and sequentially outputs horizontal scanning pulses to cause the pixel signals after AD conversion held in the column AD conversion unit 5 to be output to the horizontal signal line 11.

The output circuit 7 performs predetermined signal processing on the AD-converted pixel signal sequentially supplied through the horizontal signal line 11, and outputs the pixel signal. For example, the output circuit 7 may perform only buffering, or may perform various digital signal processing such as black level adjustment, column variation correction, and defect correction processing. The input/output terminal 13 exchanges signals with the outside.

The solid-state imaging device 1 is a CMOS image sensor configured as described above.

2. Cross-Sectional Configuration Diagram of Pixel

Figure 2:
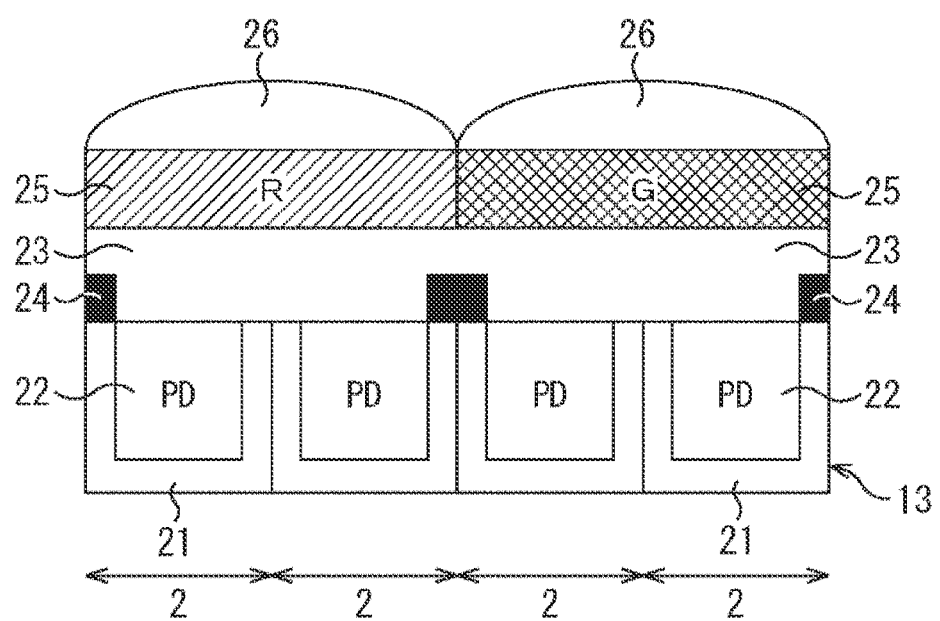
FIG. 2 is a cross-sectional view of a pixel in a pixel array unit.

FIG. 2 is a diagram illustrating a cross-sectional configuration of the pixels 2 arranged in a matrix in the pixel array unit 3 of FIG. 1.

In each pixel 2 of the pixel array unit 3, for example, an N-type (second conductivity type) semiconductor region 22 is formed in units of pixels on a semiconductor substrate (silicon substrate) 12 on which a P-type (first conductivity type) semiconductor region 21 is formed, whereby the photodiode PD is formed in units of pixels. Note that, in FIG. 2, the semiconductor region 21 is divided into units of pixels for convenience, but such a boundary does not actually exist.

On the front surface side (the lower side in FIG. 2) of the semiconductor substrate 12, a plurality of pixel transistors for reading charges accumulated in the photodiodes PD and the like, and a multilayer wiring layer including a plurality of wiring layers and an interlayer insulating film are formed (all not illustrated).

On the other hand, on the back surface side (upper side in FIG. 2) of the semiconductor substrate 12, an oxide film 23 such as a TEOS film is formed via an antireflection film (not illustrated) including, for example, a silicon oxide film or the like.

Light shielding films 24 are formed at intervals of two pixels at pixel boundary portions on the back surface side of the semiconductor substrate 12. The light shielding film 24 may be any material as long as it shields light, but is preferably a material having a strong light shielding property and capable of being accurately processed by fine processing, for example, etching. The light shielding film 24 can include, for example, a metal film of tungsten (W), aluminum (Al), copper (Cu), titanium (Ti), molybdenum (Mo), nickel (Ni), or the like.

A color filter 25 is formed on the upper surface of the oxide film 23. The color filter 25 has, for example, one of red, green, and blue colors, and allows only light of the color (wavelength) to pass through the photodiode PD. The color filter 25 is formed by, for example, rotating and applying a photosensitive resin containing a pigment such as a pigment or a dye.

A microlens (on-chip lens) 26 is formed on the color filter 25. The microlens 26 includes, for example, a resin material such as a styrene resin, an acrylic resin, a styrene-acrylic copolymer resin, or a siloxane resin.

Each pixel of the pixel array unit 3 is configured as described above, and the solid-state imaging device 1 is a backside irradiation type solid-state imaging device in which light is incident from the back surface side opposite to the front surface side of the semiconductor substrate 12 on which the pixel transistor is formed.

Figure 3:
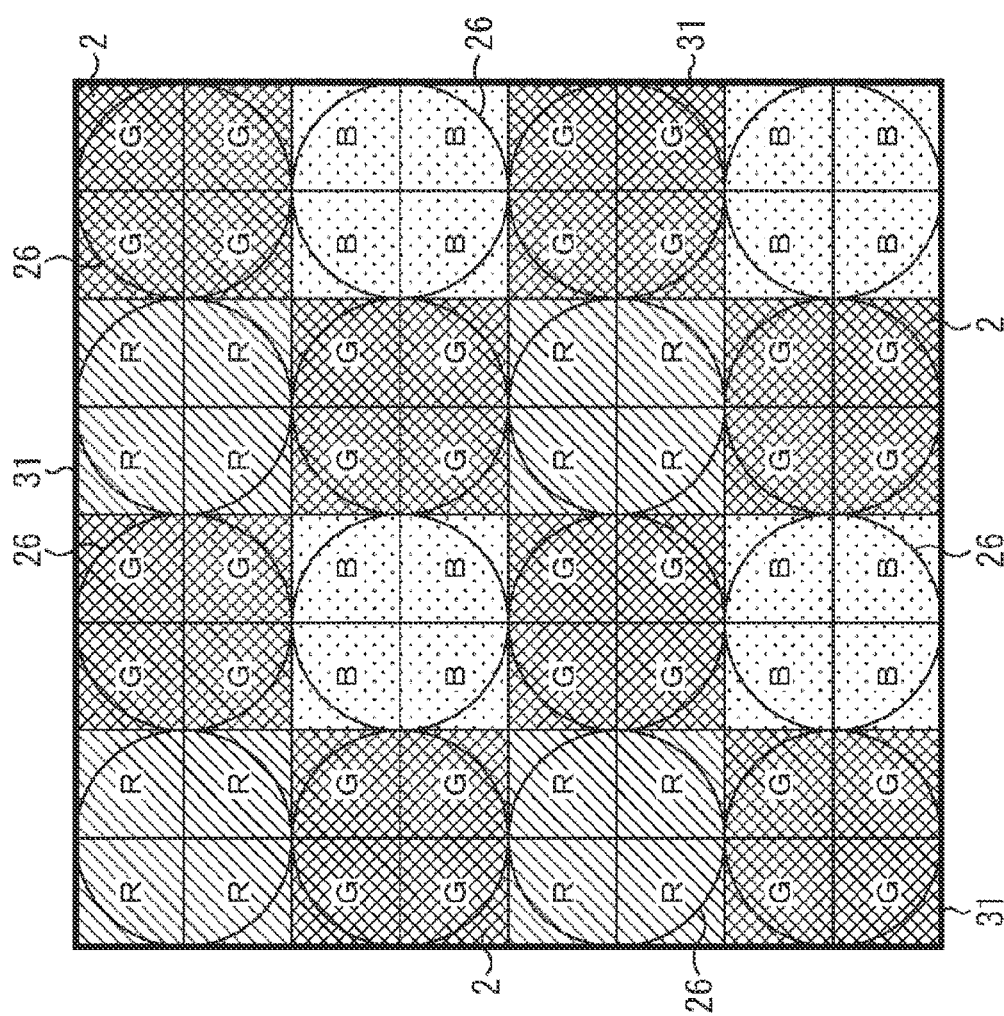
FIG. 3 is a plan view illustrating an arrangement example of microlenses and color filters.

FIG. 3 is a plan view illustrating an arrangement example of the microlenses 26 and the color filters 25 in the pixel array unit 3.

As illustrated in FIG. 3, the microlens 26 is formed so as to be one for four pixels including two pixels (2×2) in each of the vertical direction and the horizontal direction.

In addition, the color filter 25 is also arranged such that the photodiode PD of four pixels of 2×2 sharing one microlens 26 receives light of the same wavelength. The color array of the color filter 25 is, for example, a Bayer array in units of four pixels of 2×2.

In the following description, a pixel having the green color filter 25 and receiving the green light is referred to as a G pixel, a pixel having the red color filter 25 and receiving the red light is referred to as an R pixel, and a pixel having the blue color filter 25 and receiving the blue light is referred to as a B pixel. Further, a pixel row in which R pixels and G pixels are arranged in the horizontal direction is referred to as an RG pixel row, and a pixel row in which G pixels and B pixels are arranged in the horizontal direction is referred to as a GB pixel row. Furthermore, units of four pixels of 2×2 sharing one microlens 26 are referred to as units of OCL, and a unit of 64 pixels of 8×8 illustrated in FIG. 3 is referred to as a pixel unit 31.

3. Basic Circuit Example of Shared Pixel Structure

Next, a shared pixel structure adopted in the solid-state imaging device 1 in FIG. 1 will be described. Before that, a basic circuit of the shared pixel structure as a premise of a pixel circuit of the solid-state imaging device 1 will be described with reference to FIG. 4.

Figure 4:
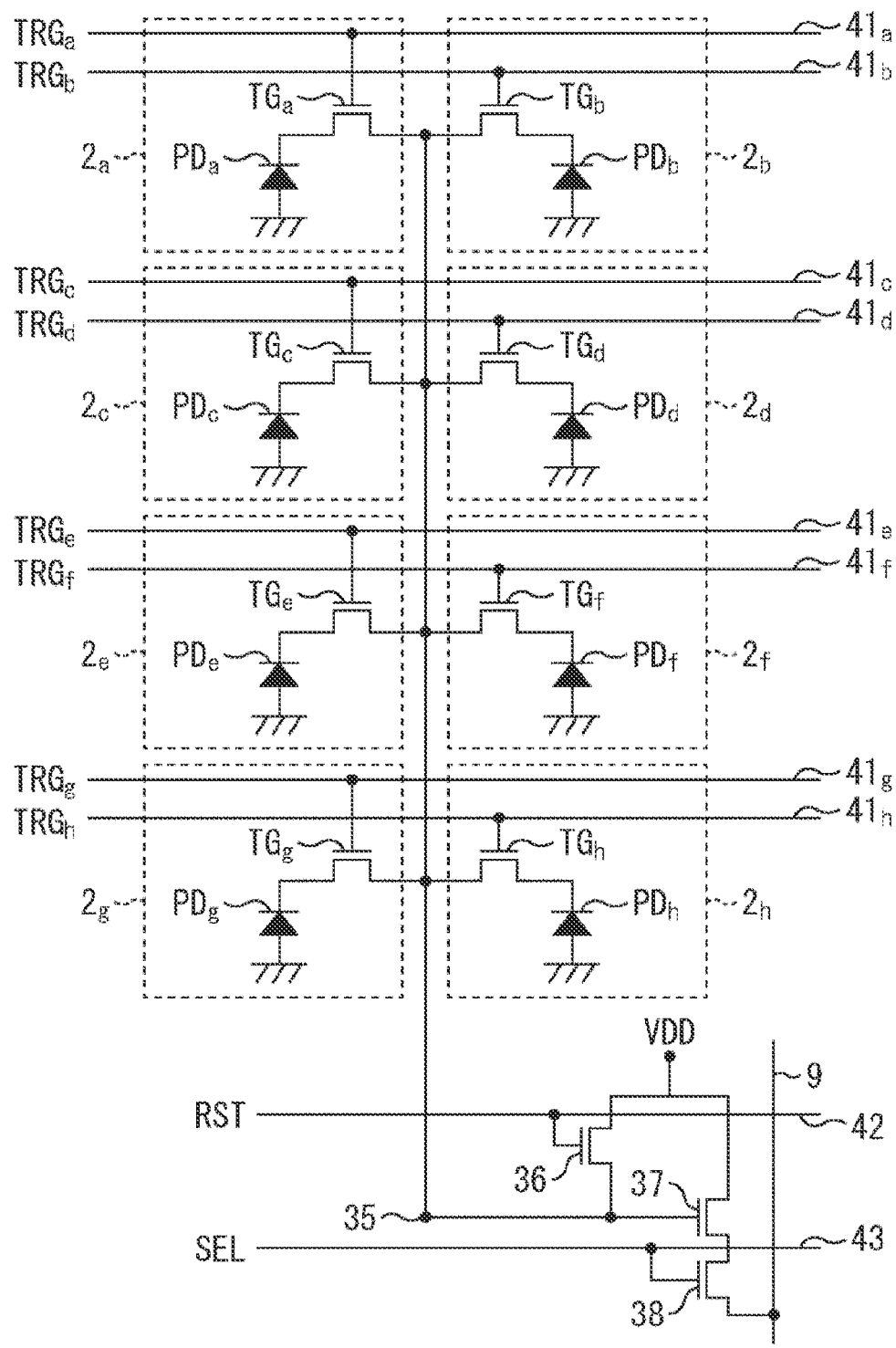
FIG. 4 is a diagram illustrating a basic circuit of a shared pixel structure.

FIG. 4 illustrates a basic circuit of a shared pixel structure in which one FD is shared by a total of eight pixels including four pixels in the vertical direction and two pixels (4×2) in the horizontal direction.

Figure 5:
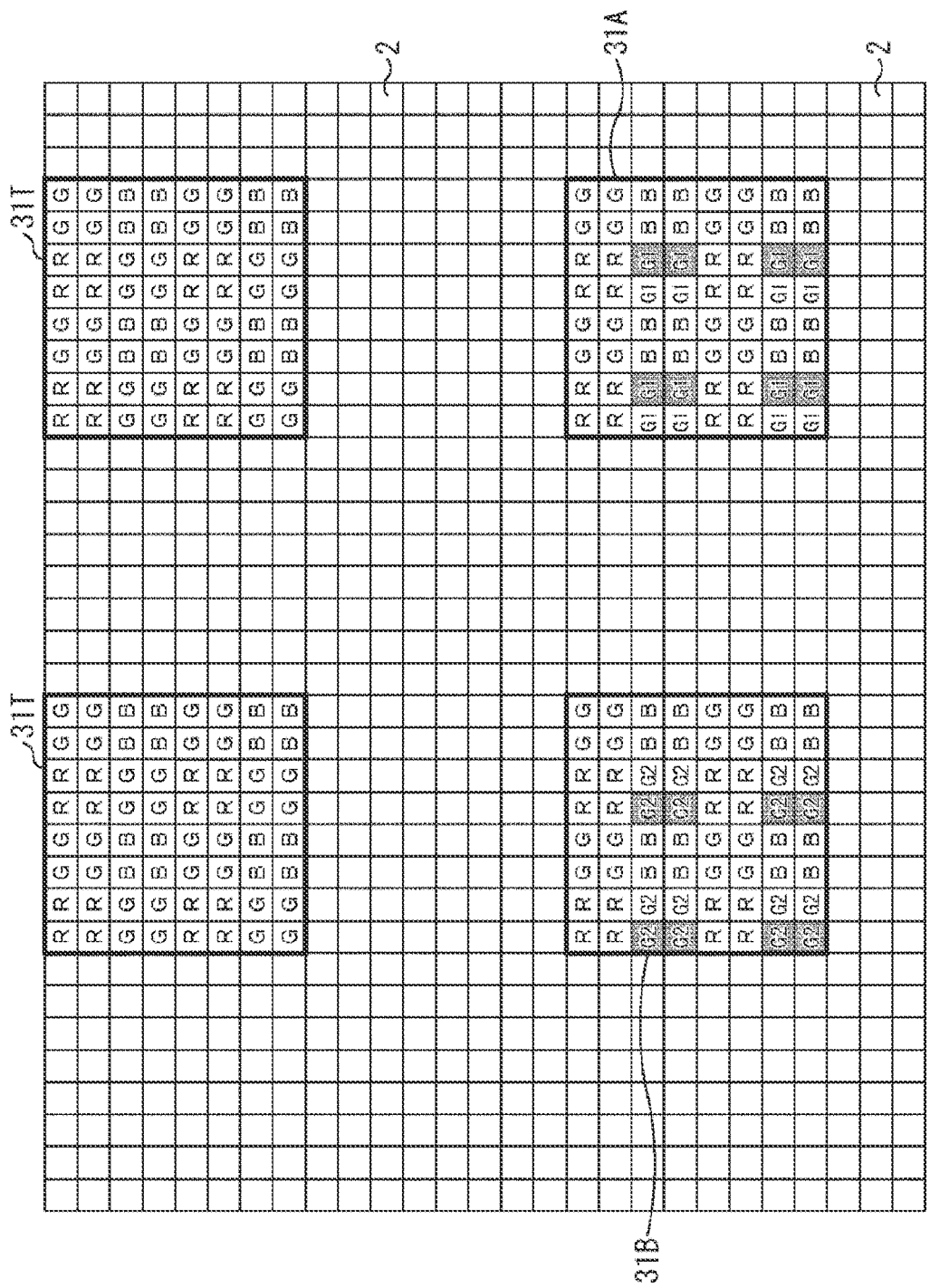
FIG. 5 is a plan view illustrating a pixel arrangement example of the solid-state imaging device.

In a case of distinguishing each pixel 2 of 4×2 sharing one FD, as illustrated in FIG. 5, the pixel 2 is distinguished from the pixels $2_a$ to $2_h$. Hereinafter, a total of eight pixels of 4×2 sharing one FD is also referred to as an FD sharing unit.

Each pixel 2 individually includes a photodiode PD and a transfer transistor TG that transfers charge accumulated in the photodiode PD. Then, each of the FD 35, the reset transistor 36, the amplification transistor 37, and the selection transistor 38 is commonly used by eight pixels that are sharing units.

Note that, in the following description, each of the reset transistor 36, the amplification transistor 37, and the selection transistor 38 used in common by eight pixels that are sharing units is also referred to as a sharing pixel transistor. Furthermore, in order to distinguish the photodiode PD and the transfer transistor TG arranged in each of the pixels $2_a$ to $2_h$ in the sharing unit, as illustrated in FIG. 5, they are referred to as photodiodes $PD_a$ to $PD_h$ and transfer transistors $TG_a$ to $TG_h$.

Each of the photodiodes $PD_a$ to $PD_h$ receives and photoelectrically converts light, and generates and accumulates signal charges.

When the drive signal $TRG_a$ supplied to the gate electrode via the signal line $41_a$ becomes High, the transfer transistor $TG_a$ becomes an active state (ON) in response thereto, and transfers the signal charge accumulated in the photodiode $PD_a$ to the FD 35. When the drive signal $TRG_b$ supplied to the gate electrode via the signal line $41_b$ becomes High, the transfer transistor $TG_b$ becomes an active state in response thereto, and transfers the signal charge accumulated in the photodiode $PD_b$ to the FD 35. When the drive signal $TRG_c$ supplied to the gate electrode via the signal line $41_c$ becomes High, the transfer transistor $TG_c$ becomes an active state in response thereto, and transfers the signal charge accumulated in the photodiode $PD_c$ to the FD 35. When the drive signal $TRG_d$ supplied to the gate electrode via the signal line $41_d$ becomes High, the transfer transistor $TG_d$ becomes an active state in response thereto, and transfers the signal charge accumulated in the photodiode $PD_d$ to the FD 35. The photodiodes $PD_e$ to $PD_h$ and the transfer transistors $TG_e$ to $TG_h$ operate similarly to the photodiodes $PD_a$ to $PD_d$ and the transfer transistors $TG_a$ to $TG_d$.

The FD 35 temporarily holds the signal charges supplied from the photodiodes $PD_a$ to $PD_h$.

When a drive signal RST supplied to the gate electrode via the signal line 42 becomes High, the reset transistor 36 becomes an active state (ON) in response thereto, and resets the potential of the FD 35 to a predetermined level (reset voltage VDD).

The amplification transistor 37 has a source electrode connected to the vertical signal line 9 via the selection transistor 38, thereby forming a source follower circuit with a load MOS (not illustrated) of a constant current source circuit unit connected to one end of the vertical signal line 9.

The selection transistor 38 is connected between the source electrode of the amplification transistor 37 and the vertical signal line 9. When the selection signal SEL supplied to the gate electrode via the signal line 43 becomes High, the selection transistor 38 becomes an active state (ON) in response thereto, and outputs the pixel signal of the pixel 2 in the sharing unit output from the amplification transistor 37 to the vertical signal line 9 with the sharing unit as a selected state.

The plurality of pixels 2 in the sharing unit can output pixel signals in units of one pixel or can simultaneously output pixel signals in units of a plurality of pixels according to a drive signal from the vertical drive circuit 4 (FIG. 1).

For example, in a case where the pixel signal is output in units of one pixel, the vertical drive circuit 4 is only required to transfer the charge accumulated in the photodiode PD to the FD 35 by sequentially turning on the transfer transistors $TG_a$ to $TG_h$, and output the charge to the vertical signal line 9 via the selection transistor 38.

For example, in a case where a pixel signal is output in units of OCL of four pixels of 2×2, the vertical drive circuit 4 is only required to transfer charges of all the four pixels to the FD 35 by simultaneously turning on the transfer transistors TG of the four pixels in units of OCL, and output the charges to the vertical signal line 9 via the selection transistor 38.

As illustrated in FIG. 3, in a case where one microlens 26 is arranged in four pixels of 2×2, for example, in the photodiodes PD of two pixels on the left side of 2×2 and the photodiodes PD of two pixels on the right side of 2×2, the formation positions of the photodiodes PD with respect to the microlens 26 are different, and thus, a shift (phase difference) occurs in the images generated from the two photodiodes PD. In addition, even in the photodiodes PD of the upper two pixels and the photodiodes PD of the lower two pixels, since the formation positions of the photodiodes PD with respect to the microlens 26 are different, a shift (phase difference) occurs in the images generated from the two photodiodes PD.

Therefore, by outputting four pixels sharing one microlens 26 as pixel signals in units of two pixels on the left and right or upper and lower sides, a phase difference can be detected, and the phase difference can be used as an autofocus control signal of an imaging device in which the solid-state imaging device 1 is incorporated.

However, in the pixel circuit configuration of FIG. 4, in order to acquire the pixel signals in units of two pixels on the left and right or upper and lower sides in units of OCL, it is necessary to sequentially read the pixel signals in units of two pixels on the left and right or upper and lower sides, which causes a decrease in the frame rate.

Therefore, the solid-state imaging device 1 in FIG. 1 is configured to be able to output the phase difference signal without lowering the frame rate, in other words, by reading four pixels in units of OCL once. Hereinafter, the configuration will be described.

4. Arrangement Example of Phase Difference Pixel

FIG. 5 is a plan view illustrating a pixel arrangement example in the pixel array unit 3 of the solid-state imaging device 1.

In the pixel array unit 3, pixel units 31 including units of 64 pixels of 8×8 illustrated in FIG. 3 are repeatedly arranged in the vertical direction and the horizontal direction.

Here, when the pixel array unit 3 is viewed in units of pixel units 31, the phase difference pixel units 31A and 31B and a normal pixel unit 31T are arranged in the pixel array unit 3 according to a predetermined rule or randomly. The phase difference pixel units 31A and 31B are the pixel unit 31 in which phase difference pixels capable of outputting a phase difference signal is arranged in some of the pixels 2 of the pixel unit 31. The phase difference pixel unit 31A is the pixel unit 31 in which a phase difference pixel that outputs a phase difference signal of a left half in units of OCL is arranged, and the phase difference pixel unit 31B is the pixel unit 31 in which a phase difference pixel that outputs a phase difference signal of a right half in units of OCL is arranged. The normal pixel unit 31T is the pixel unit 31 in which no phase difference pixel is arranged.

In the normal pixel unit 31T and the phase difference pixel units 31A and 31B illustrated in FIG. 5, the pixel 2 described as "G" is a G pixel, the pixel 2 described as "R" is an R pixel, and the pixel 2 described as "B" is a B pixel.

Furthermore, in the phase difference pixel units 31A and 31B, the pixel 2 described as "G1" is a G pixel of a phase difference pixel capable of outputting a phase difference signal of two pixels on the left side, and the pixel 2 described as "G2" is a G pixel of a phase difference pixel capable of outputting a phase difference signal of two pixels on the right side. In FIG. 5, "R", "G", "B", "G1", and "G2" other than the pixels 2 denoted by the reference numerals of the normal pixel unit 31T and the phase difference pixel units 31A and 31B are omitted.

Note that, in the present embodiment, an example in which a phase difference pixel capable of outputting a phase difference signal among the R pixel, the G pixel, and the B pixel is arranged in the G pixel will be described, but the phase difference pixel may be arranged in the G pixel or the B pixel.

Figure 6:
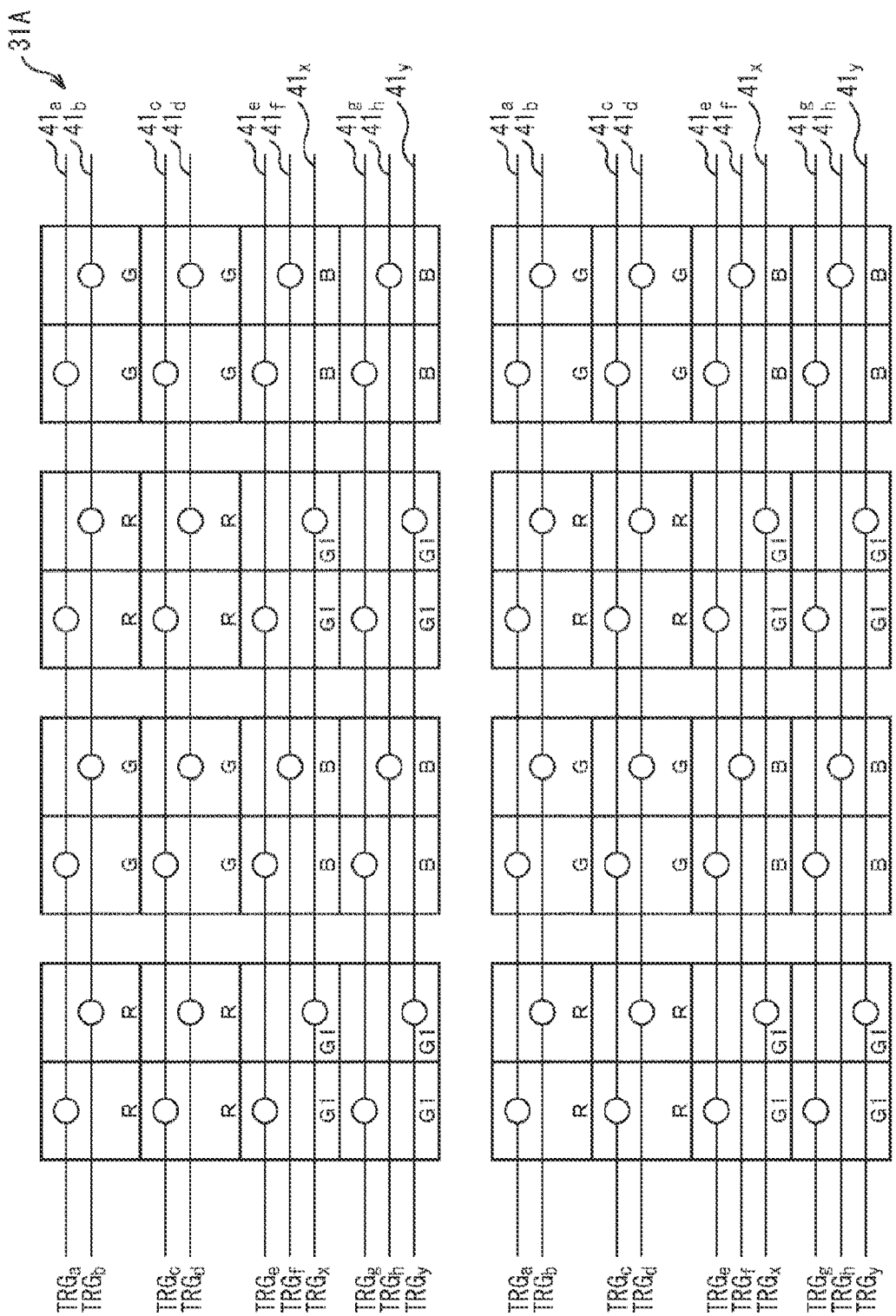
FIG. 6 is a plan view illustrating an example of signal line wiring in the phase difference pixel unit.

FIG. 6 is a plan view illustrating a wiring example of the signal line 41 that transmits the drive signal TRG to the transfer transistor TG of each pixel 2 in the phase difference pixel unit 31A.

Figure 7:
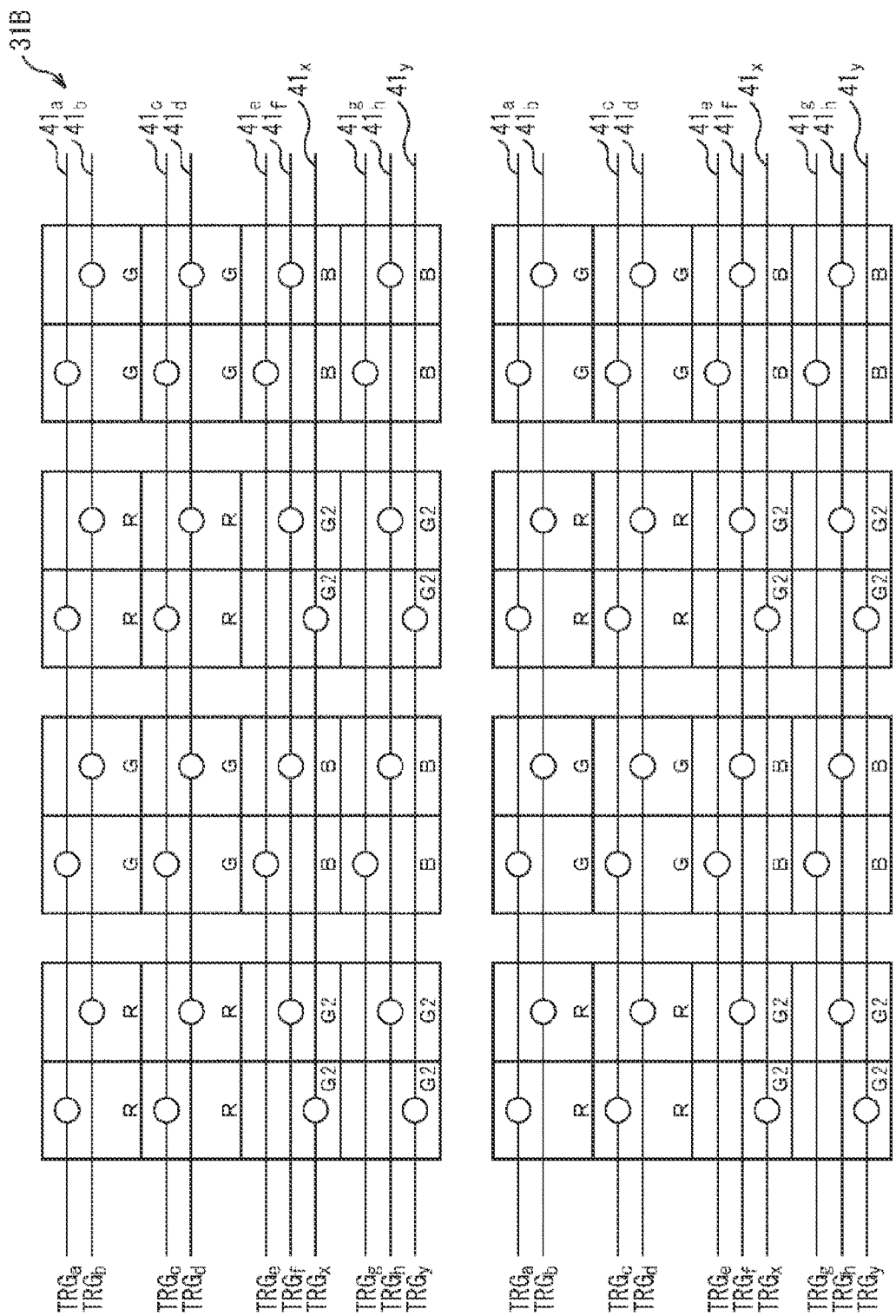
FIG. 7 is a plan view illustrating an example of signal line wiring in the phase difference pixel unit.
Figure 8:
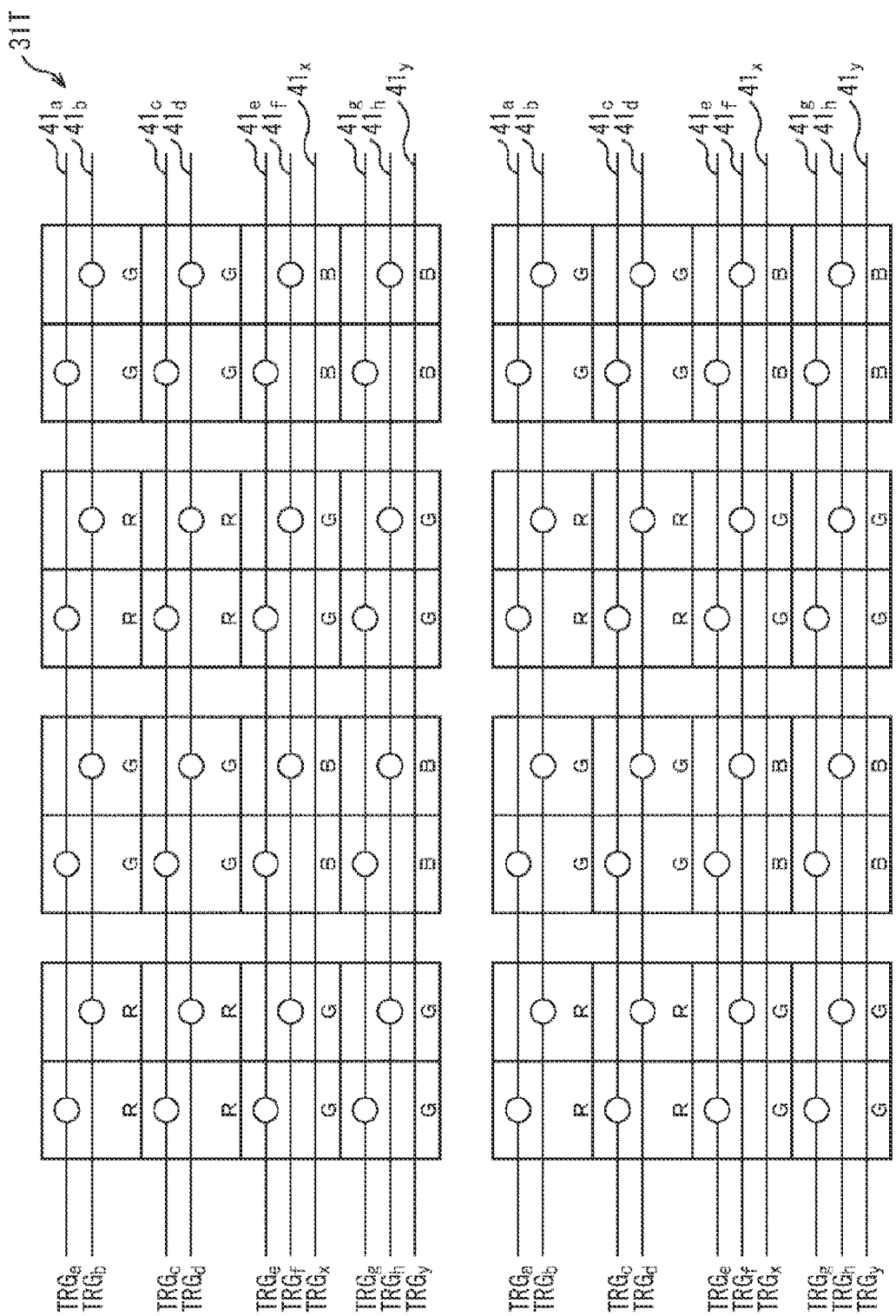
FIG. 8 is a plan view illustrating an example of signal line wiring in a normal pixel unit.

Note that, in FIGS. 6 to 8, in order to make the drawing easy to see, the pixel units 31 are illustrated separately in FD sharing units of eight pixels of 4×2 sharing the FD 35.

In the pixel circuit that shares one FD 35 in units of eight pixels of 4×2, as described in the basic circuit of FIG. 4, if two signal lines 41 are arranged in each row and a total of eight signal lines 41 are arranged in four rows of the FD sharing unit, it is possible to perform control to read the pixel signal in units of pixels or read the pixel signal in units of OCL.

On the other hand, in the phase difference pixel unit 31A, two signal lines $41_x$ and $41_y$ are added in addition to the signal lines $41_a$ to $41_h$ of the basic circuit in four rows of the FD sharing unit.

The signal line $41_x$ transmits a drive signal $TRG_x$ to the transfer transistor TG of the predetermined pixel 2 in the GB pixel row. The signal line $41_y$ transmits a drive signal $TRG_y$ to the transfer transistor TG of the predetermined pixel 2 in the GB pixel row. A circle (○) written at a predetermined position on the signal line 41 ($41_a$ to $41_y$) of each pixel 2 represents a contact point between the gate electrode of the transfer transistor TG and the signal line 41.

As indicated by circles in FIG. 6, in the phase difference pixel unit 31A, the gate electrodes of the transfer transistors TG of two G1 pixels on the right side among the four G1 pixels in units of OCL are connected to the signal line $41_x$ or $41_y$, not the signal line $41_f$ or $41_h$. The connection between the gate electrode of the transfer transistor TG in the other FD sharing units and the signal line 41 is similar to that in FIG. 4.

In the phase difference pixel unit 31A, when two B pixels of the GB pixel row in which the three signal lines $41_e$, $41_f$, and $41_x$ are arranged are a first pixel and a second pixel, and two G1 pixels are a third pixel and a fourth pixel, the transfer transistor TG of the first pixel (B pixel on the left side) and the transfer transistor TG of the fourth pixel (G1 pixel on the left side) are controlled by the drive signal $TRG_e$ of the same signal line $41_e$. The transfer transistor TG of the second pixel (B pixel on the right side) is controlled by the drive signal $TRG_f$ of the signal line $41_f$ and the transfer transistor TG of the third pixel (G1 pixel on the right side) is controlled by the drive signal $TRG_x$ of the signal line $41_x$. Similarly, the GB pixel row in which three signal lines $41_g$, $41_h$, and $41_y$ are arranged.

An operation of adding (FD adding) and outputting the pixel signals in units of OCL of 2×2 in the phase difference pixel unit 31A of FIG. 6 will be described.

First, the vertical drive circuit 4 controls the drive signals $TRG_a$ to $TRG_d$ of the two RG pixel rows of the FD sharing unit on the upper side of the phase difference pixel unit 31A to be High. As a result, the transfer transistors $TG_e$ to $TG_d$ of the R pixel and the G pixel in units of OCL connected to the signal lines $41_a$ to $41_d$ are turned on, and the signal charge accumulated in the photodiode PD is transferred to the FD 35 and output as a pixel signal.

Next, the vertical drive circuit 4 controls the drive signals $TRG_e$ to $TRG_h$ of the two GB pixel rows of the FD sharing unit on the upper side of the phase difference pixel unit 31A to be High. As a result, the signal charges accumulated in the photodiodes PD of the G1 pixel and the B pixel in units of OCL connected to the signal lines $41_e$ to $41_h$ are transferred to the FD 35 and output as pixel signals. At this time, since the gate electrodes of the transfer transistors TG are not connected to any of the signal lines $41_e$ to $41_h$ in the two G1 pixels on the right side among the four G1 pixels in units of OCL, the accumulated charges in the two G1 pixels on the right side are not transferred to the FD 35, and only the accumulated charges in the two G1 pixels on the left side are transferred to the FD 35.

Next, the vertical drive circuit 4 controls the drive signals $TRG_a$ to $TRG_d$ of the two RG pixel rows of the FD sharing unit on the lower side of the phase difference pixel unit 31A to be High. As a result, the signal charges accumulated in the photodiodes PD of the R pixel and the G pixel in units of OCL connected to the signal lines $41_a$ to $41_d$ are transferred to the FD 35 and output as pixel signals.

Next, the vertical drive circuit 4 controls the drive signals $TRG_e$ to $TRG_h$ of the two GB pixel rows of the FD sharing unit on the lower side of the phase difference pixel unit 31A to be High. As a result, the signal charges accumulated in the photodiodes PD of the G1 pixel and the B pixel in units of OCL connected to the signal lines $41_e$ to $41_h$ are transferred to the FD 35 and output as pixel signals. At this time, since the gate electrodes of the transfer transistors TG are not connected to any of the signal lines $41_e$ to $41_h$ in the two G1 pixels on the right side among the four G1 pixels in units of OCL, the accumulated charges in the two G1 pixels on the right side are not transferred to the FD 35, and only the accumulated charges in the two G1 pixels on the left side are transferred to the FD 35.

Figure 9:
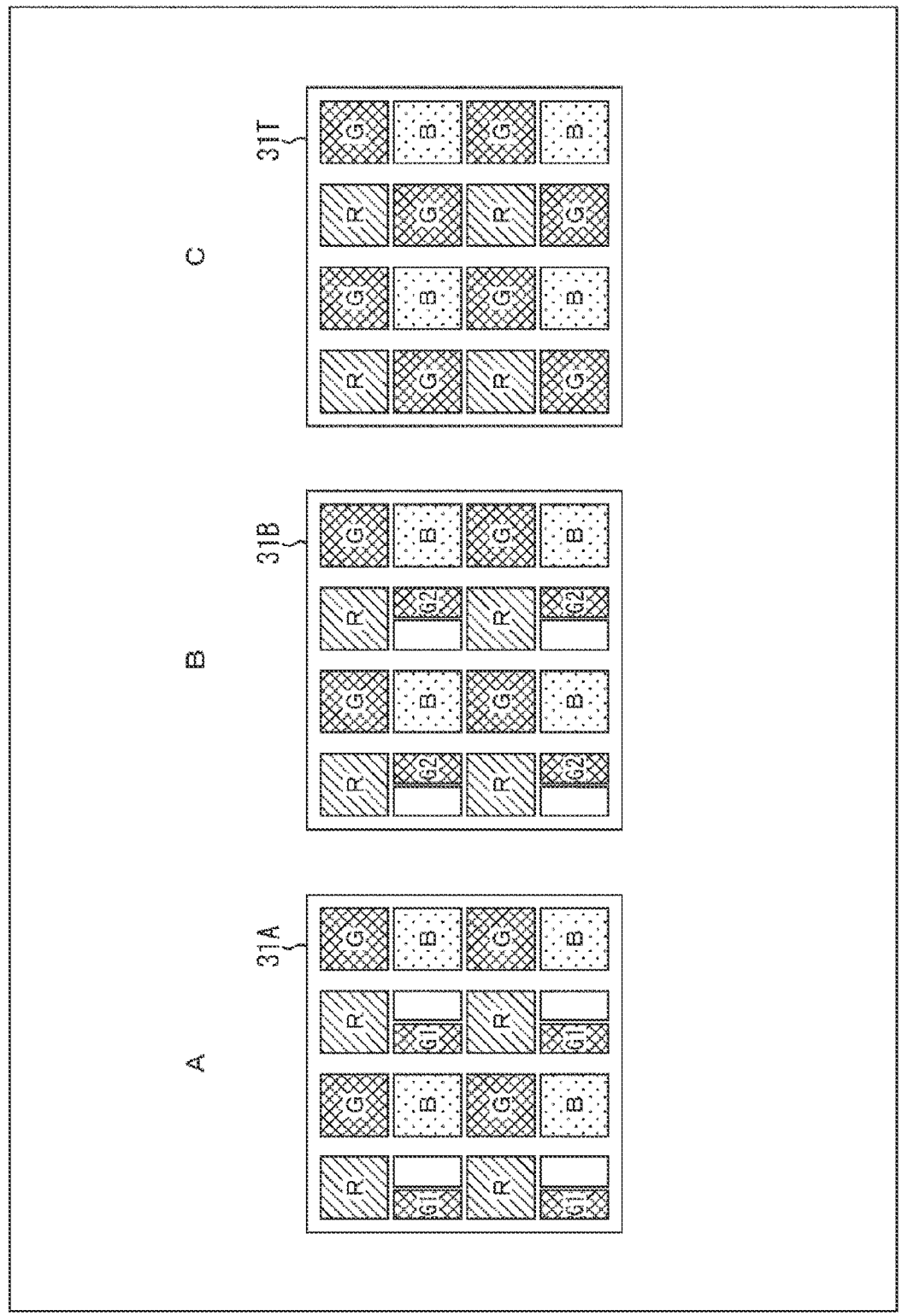
FIG. 9 is a diagram illustrating an output image of a pixel signal in units of pixel units.

When the above driving is performed, as illustrated in A of FIG. 9, the solid-state imaging device 1 can acquire the R pixel, the G pixel, and the B pixel of the phase difference pixel unit 31A as a signal obtained by adding up the pixel signals of the four pixels in units of OCL, and can acquire the G1 pixel as a signal obtained by adding up the pixel signals of the two pixels in the left half in units of OCL. That is, in the phase difference pixel unit 31A, it is possible to output the phase difference signal by reading four pixels in units of OCL once.

FIG. 9 is a diagram illustrating an output image of a pixel signal in units of pixel units in a case where the solid-state imaging device 1 operates in a drive mode (output mode in units of OCL) in which a signal obtained by adding four pixels in units of OCL is output as a pixel signal.

FIG. 7 is a plan view illustrating a wiring example of the signal line 41 that transmits the drive signal TRG to the transfer transistor TG of each pixel 2 in the phase difference pixel unit 31B.

Also in the phase difference pixel unit 31B, in addition to the signal lines $41_a$ to $41_h$ of the basic circuit, two signal lines $41_x$ and $41_y$ are added to four rows of the FD sharing unit.

As indicated by circles in FIG. 7, in the phase difference pixel unit 31B, the gate electrodes of the transfer transistors TG of the two G2 pixels on the left side among the four G2 pixels in units of OCL are connected to the signal line $41_x$ or $41_y$, not the signal line $41_e$ or $41_g$.

In the phase difference pixel unit 31B, assuming that two B pixels of the GB pixel row in which the three signal lines $41_e$, $41_f$, and $41_x$ are arranged are a first pixel and a second pixel, and two G2 pixels are a third pixel and a fourth pixel, the transfer transistor TG of the first pixel (B pixel on the right side) and the transfer transistor TG of the fourth pixel (G2 pixel on the right side) are controlled by the drive signal $TRG_f$ of the same signal line $41_f$. The transfer transistor TG of the second pixel (B pixel on the left side) is controlled by the drive signal $TRG_e$ of the signal line $41_e$, and the transfer transistor TG of the third pixel (G2 pixel on the left side) is controlled by the drive signal $TRG_x$ of the signal line $41_x$. Similarly, the GB pixel row in which three signal lines $41_g$, $41_h$, and $41_y$ are arranged.

An operation of adding (FD adding) and outputting the pixel signals in units of OCL of 2×2 in the phase difference pixel unit 31B of FIG. 7 will be described.

First, the vertical drive circuit 4 controls the drive signals $TRG_a$ to $TRG_d$ of the two RG pixel rows of the FD sharing unit on the upper side of the phase difference pixel unit 31B to be High. As a result, the signal charges accumulated in the photodiodes PD of the R pixel and the G pixel in units of OCL connected to the signal lines $41_a$ to $41_d$ are transferred to the FD 35 and output as pixel signals.

Next, the vertical drive circuit 4 controls the drive signals $TRG_e$ to $TRG_h$ of the two GB pixel rows of the FD sharing unit on the upper side of the phase difference pixel unit 31B to be High. As a result, the signal charges accumulated in the photodiodes PD of the G2 pixel and the B pixel in units of OCL connected to the signal lines $41_e$ to $41_h$ are transferred to the FD 35 and output as pixel signals. At this time, since the gate electrodes of the transfer transistors TG are not connected to any of the signal lines $41_e$ to $41_h$ in the two G2 pixels on the left side among the four G2 pixels in units of OCL, the accumulated charges in the two G2 pixels on the left side are not transferred to the FD 35, and only the accumulated charges in the two G2 pixels on the right side are transferred to the FD 35.

Next, the vertical drive circuit 4 controls the drive signals $TRG_a$ to $TRG_d$ of the two RG pixel rows of the FD sharing unit on the lower side of the phase difference pixel unit 31B to be High. As a result, the signal charges accumulated in the photodiodes PD of the R pixel and the G pixel in units of OCL connected to the signal lines $41_a$ to $41_d$ are transferred to the FD 35 and output as pixel signals.

Next, the vertical drive circuit 4 controls the drive signals $TRG_e$ to $TRG_h$ of the two GB pixel rows of the FD sharing unit on the lower side of the phase difference pixel unit 31B to be High. As a result, the signal charges accumulated in the photodiodes PD of the G2 pixel and the B pixel in units of OCL connected to the signal lines $41_e$ to $41_h$ are transferred to the FD 35 and output as pixel signals. At this time, since the gate electrodes of the transfer transistors TG are not connected to any of the signal lines $41_e$ to $41_h$ in the two G2 pixels on the left side among the four G2 pixels in units of OCL, the accumulated charges in the two G2 pixels on the left side are not transferred to the FD 35, and only the accumulated charges in the two G2 pixels on the right side are transferred to the FD 35.

When the above driving is performed, as illustrated in B of FIG. 9, the solid-state imaging device 1 can acquire the R pixel, the G pixel, and the B pixel of the phase difference pixel unit 31B as a signal obtained by adding the pixel signals of the four pixels in units of OCL, and can acquire the G2 pixel as a signal obtained by adding the pixel signals of the two pixels in the right half in units of OCL. That is, in the phase difference pixel unit 31B, the phase difference signal can be output by performing reading once for four pixels in units of OCL.

FIG. 8 is a plan view illustrating a wiring example of the signal line 41 that transmits the drive signal TRG to the transfer transistor TG of each pixel 2 in the normal pixel unit 31T.

Also in the normal pixel unit 31T, in four rows of the FD sharing unit, two signal lines $41_x$ and $41_y$ are added in addition to the signal lines $41_a$ to $41_h$ of the basic circuit.

However, in the normal pixel unit 31T, there is no pixel 2 in which the gate electrode of the transfer transistor TG is connected to the added signal line $41_x$ or $41_y$. In other words, the gate electrodes of the transfer transistors TG of all the R pixel, G pixel, and B pixel are connected to any of the signal lines $41_a$ to $41_h$.

An operation of adding (FD adding) and outputting the pixel signals in units of OCL of 2×2 in the normal pixel unit 31T in FIG. 8 will be described.

First, the vertical drive circuit 4 controls the drive signals $TRG_a$ to $TRG_d$ of the two RG pixel rows of the FD sharing unit on the upper side of the normal pixel unit 31T to be High. As a result, the signal charges accumulated in the photodiodes PD of the R pixel and the G pixel in units of OCL connected to the signal lines $41_a$ to $41_d$ are transferred to the FD 35 and output as pixel signals.

Next, the vertical drive circuit 4 controls the drive signals $TRG_e$ to $TRG_h$ of the two GB pixel rows of the FD sharing unit on the upper side of the normal pixel unit 31T to be High. As a result, the signal charges accumulated in the photodiodes PD of the G pixel and the B pixel in units of OCL connected to the signal lines $41_e$ to $41_h$ are transferred to the FD 35 and output as pixel signals.

Next, the vertical drive circuit 4 controls the drive signals $TRG_a$ to $TRG_d$ of the two RG pixel rows of the FD sharing unit on the lower side of the normal pixel unit 31T to be High. As a result, the signal charges accumulated in the photodiodes PD of the R pixel and the G pixel in units of OCL connected to the signal lines $41_a$ to $41_d$ are transferred to the FD 35 and output as pixel signals.

Next, the vertical drive circuit 4 controls the drive signals $TRG_e$ to $TRG_h$ of the two GB pixel rows of the FD sharing unit on the lower side of the normal pixel unit 31T to be High. As a result, the signal charges accumulated in the photodiodes PD of the G pixel and the B pixel in units of OCL connected to the signal lines $41_e$ to $41_h$ are transferred to the FD 35 and output as pixel signals.

When the above driving is performed, as illustrated in C of FIG. 9, the solid-state imaging device 1 can acquire all of the R pixel, the G pixel, and the B pixel of the normal pixel unit 31T as a signal obtained by adding up the pixel signals of the four pixels in units of OCL. That is, in the normal pixel unit 31T, all the pixel signals are signals obtained by adding up the pixel signals of four pixels that are units of OCL.

Note that, in a case where it is not desired to output the phase difference signal in the phase difference pixel units 31A and 31B, in other words, in a drive mode in which the phase difference signal is not output, the solid-state imaging device 1 is driven as follows.

In the phase difference pixel units 31A and 31B, the vertical drive circuit 4 simultaneously controls the drive signals $TRG_x$ and $TRG_y$ supplied via the two signal lines $41_x$ and $41_y$ to be High at the timing of controlling the drive signals $TRG_e$ to $TRG_h$ of the two GB pixel rows of the upper FD sharing units to be High. As a result, since the signal charges accumulated in the photodiodes PD of the four G1 pixels or G2 pixels, which are units of OCL, are transferred to the FD 35, a signal obtained by adding (FD adding) the pixel signals in units of OCL of 2×2 is output.

That is, in the drive mode (first drive mode) in which the phase difference signal is not output, the vertical drive circuit 4 of the solid-state imaging device 1 controls all of the drive signals $TRG_e$ to $TRG_h$ and the drive signals $TRG_x$ and $TRG_y$ of the two GB pixel rows to be High, and controls all of the transfer transistors $TG_e$ to $TG_h$ to be in the active state. On the other hand, in the drive mode (second drive mode) for outputting the phase difference signal, the vertical drive circuit 4 controls only the drive signals $TRG_e$ to $TRG_h$ of the two GB pixel rows to be High, and controls only the transfer transistors $TG_e$ and $TG_g$ in the left half or only the transfer transistors $TG_f$ and $TG_h$ in the right half in units of OCL to be in the active state. As a result, it is possible to output the phase difference signal by performing read operation for each pixel once without lowering the frame rate.

Note that, according to the wiring configuration of the signal lines 41 illustrated in FIGS. 6 to 8, the number of the signal lines 41 per row is two for the GR pixel row that does not output the phase difference signal, but three signal lines 41 may be wired per row also for the GR pixel row in accordance with the GB pixel row that outputs the phase difference signal.

5. Configuration Example of Column AD Conversion Unit

Figure 10:
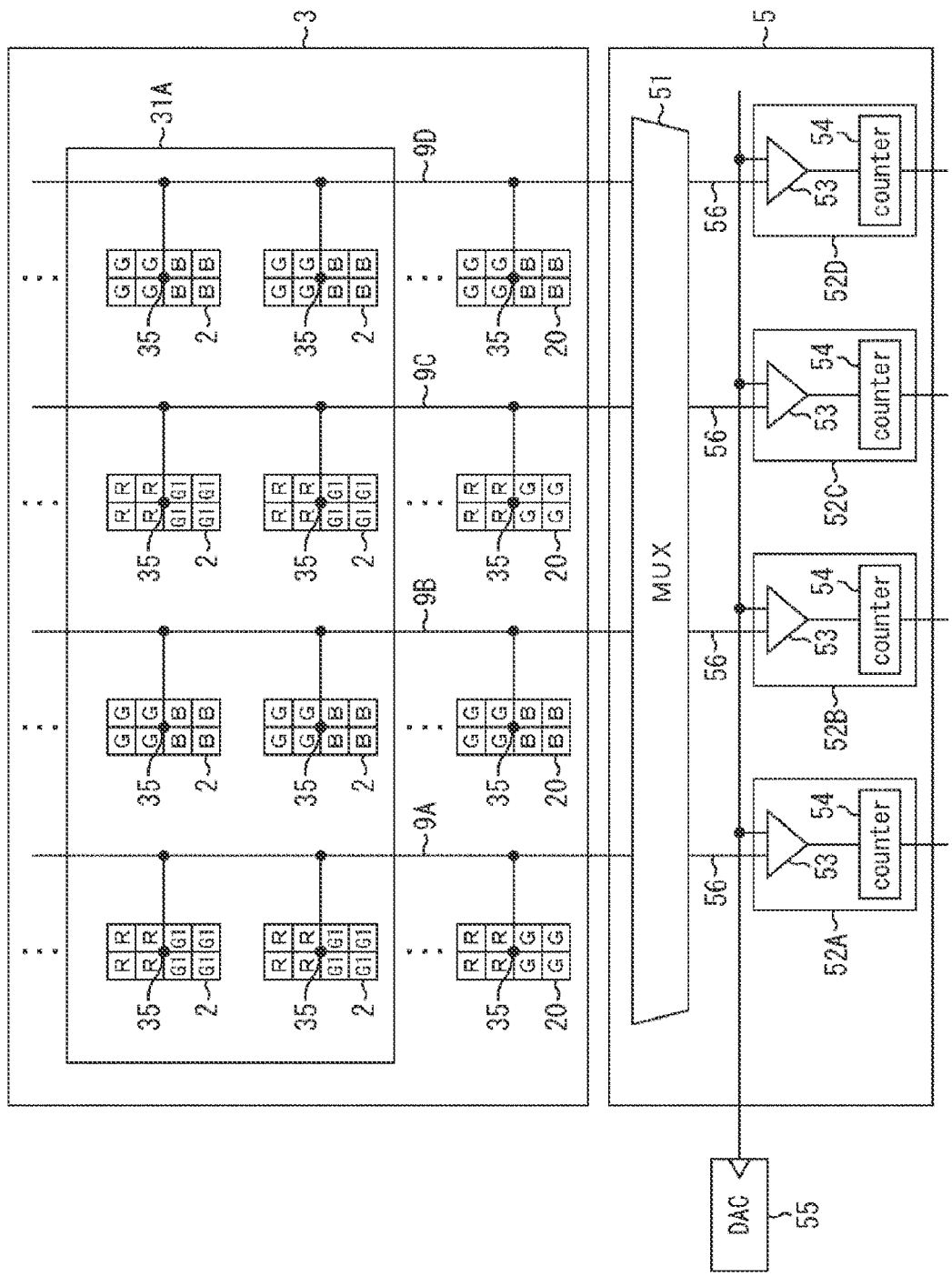
FIG. 10 is a block diagram illustrating a configuration example of a column AD conversion unit.

FIG. 10 is a block diagram illustrating a configuration example of the column AD conversion unit 5.

As illustrated in FIG. 10, the column AD conversion unit 5 is provided with ADC 52 on a one-to-one basis with the vertical signal line 9. Then, a multiplexer (MUX) 51 is provided between the vertical signal line 9 of the pixel array unit 3 and the input signal line 56 to the ADC 52.

The MUX 51 appropriately selects connection between the four vertical signal lines 9 corresponding to the pixel unit 31 and the four ADCs 52 corresponding to the four vertical signal lines 9 according to the drive mode or the like, and outputs a pixel signal input via the vertical signal line 9 to a desired ADC 52.

Now, the four vertical signal lines connected to the input stage of the MUX 51 are distinguished from the vertical signal lines 9A to 9D, and the ADC 52 corresponding to the vertical signal lines 9A to 9D is referred to as ADCs 52A to 52D.

For example, in a certain drive mode, the MUX 51 connects the vertical signal line 9 and the ADC 52 on a one-to-one basis, and outputs the pixel signal input via the vertical signal line 9 to the corresponding ADC 52.

Further, for example, in a certain drive mode, the MUX 51 adds the pixel signals input via two predetermined vertical signal lines 9, and outputs the result to one predetermined ADC 52.

Note that, in the present embodiment, the number of vertical signal lines 9 and ADCs 52 that can be connected and controlled by the MUX 51 is, for example. 4, but the number of the vertical signal lines 9 and the ADCs that can be connected and controlled by the MUX 51 may be other than 4.

The ADC 52 includes a comparator 53 that compares the pixel signal of the predetermined pixel input from the MUX 51 with the ramp signal from the DAC 55, and an up/down counter 54 that counts a comparison time of the comparator.

The comparator 53 outputs a difference signal obtained by comparing the pixel signal and the ramp signal to the up/down counter 54. For example, in a case where the ramp signal is larger than the pixel signal, a Hi (High) difference signal is supplied to the up-down counter 54, and in a case where the ramp signal is smaller than the pixel signal, a Lo (Low) difference signal is supplied to the up-down counter 54.

The up/down counter 54 performs down counting only while the Hi difference signal is supplied in a preset phase (P-phase) AD conversion period, and performs up counting only while the Hi difference signal is supplied in a data phase (D-phase) AD conversion period. Then, the up/down counter 54 outputs an addition result of the down count value in the P-phase AD conversion period and the up count value in the D-phase AD conversion period as pixel data after the CDS processing and the AD conversion processing. As a result, AD conversion of the pixel signal is performed, and reset noise can be removed. Note that up-counting may be performed in the P-phase AD conversion period and down-counting may be performed in the D-phase AD conversion period.

The digital to analog converter (DAC) 55 generates a ramp signal whose level (voltage) changes stepwise with the lapse of time, and supplies the ramp signal to each ADC 52 of the column AD conversion unit 5. The DAC 55 is provided, for example, in the control circuit 8 (FIG. 1).

7. V2H2 Summing Mode

Using the configuration of the column AD conversion unit 5 illustrated in FIG. 10, the solid-state imaging device 1 has a drive mode (third drive mode) for generating and outputting a pixel signal (hereinafter, the signal is referred to as a V2H2 signal.) obtained by adding two pixels each in the vertical direction and two pixels each in the horizontal direction to a pixel signal having units of OCL of one pixel. This drive mode is referred to as a V2H2 addition mode.

Figure 11:
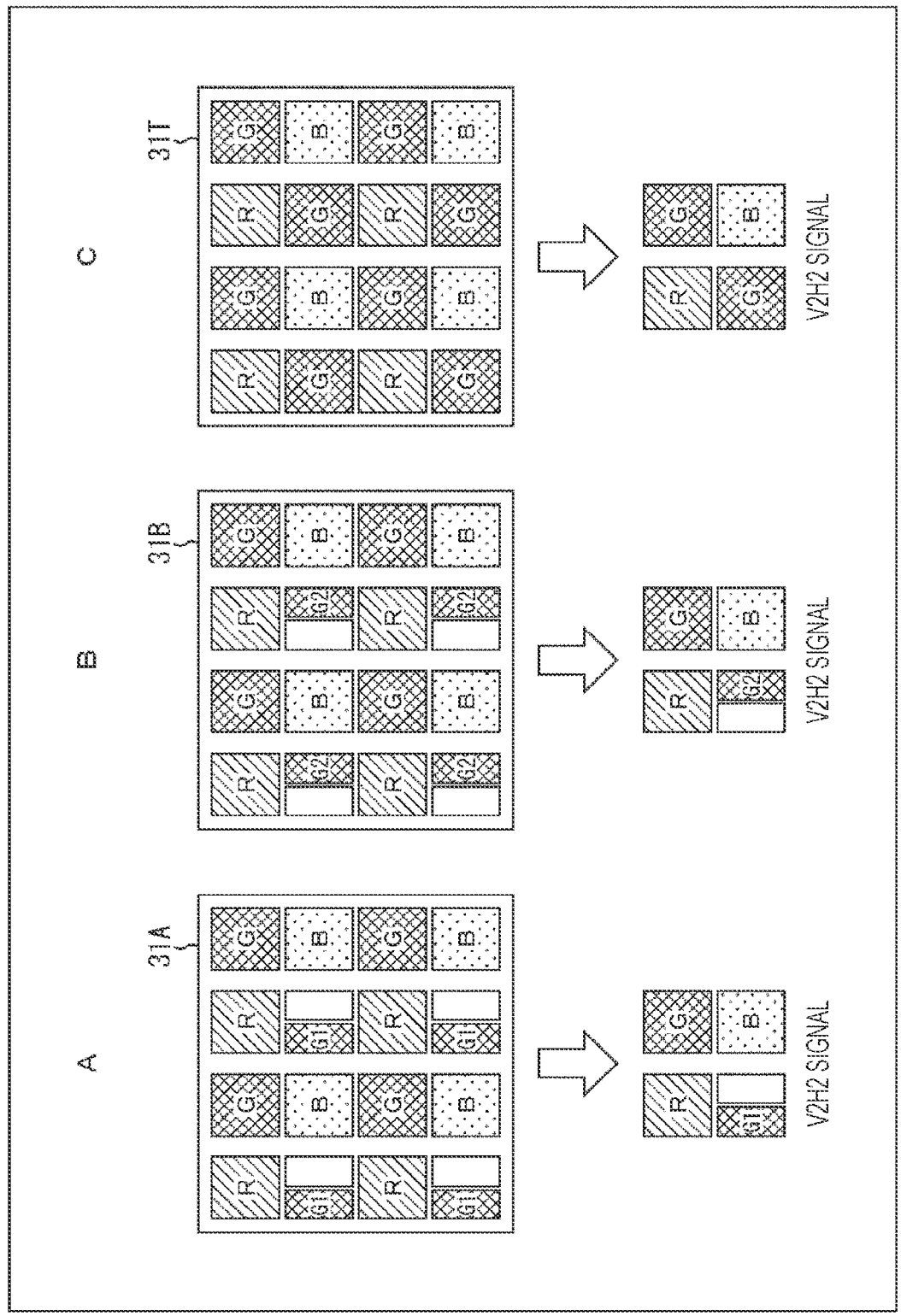
FIG. 11 is a diagram for describing processing of the column AD conversion unit in a V2H2 addition mode.

FIG. 11 is a diagram for describing the processing of the column AD conversion unit 5 in the V2H2 addition mode.

In the phase difference pixel unit 31A, as illustrated in A of FIG. 9, for the R pixel, the G pixel, and the B pixel, a signal obtained by adding up the pixel signals of the four pixels that are units of OCLs is acquired, and for the G1 pixel, a signal obtained by adding up the pixel signals of the two pixels in the left half in units of OCLs is acquired.

As illustrated in A of FIG. 11, for each of the R pixel, the G pixel, the B pixel, and the G1 pixel having units of OCL as one pixel, the column AD conversion unit 5 adds four pixels including 2×2 of two pixels in each of the vertical direction and the horizontal direction, and outputs V2H2 signals of the R pixel, the G pixel, the B pixel, and the G1 pixel.

Similarly for the phase difference pixel unit 31B, as illustrated in B of FIG. 11, the column AD conversion unit 5 adds four pixels of 2×2 in the vertical direction and the horizontal direction for each of the R pixel, the G pixel, the B pixel, and the G2 pixel having units of OCL as one pixel, and outputs the V2H2 signals of the R pixel, the G pixel, the B pixel, and the G2 pixel.

Similarly for the normal pixel unit 31T, as illustrated in C of FIG. 11, the column AD conversion unit 5 adds four pixels of 2×2 in the vertical direction and the horizontal direction for each of the R pixel, the G pixel, the B pixel, and the G pixel having one OCL unit, and outputs the V2H2 signals of the R pixel, the G pixel, the B pixel, and the G pixel.

The processing of the column AD conversion unit 5 in the V2H2 addition mode will be further described with reference to FIG. 12 in the example of the phase difference pixel unit 31A.

With units of OCL of the phase difference pixel unit 31A as one pixel, the vertical drive circuit 4 outputs the accumulated charges of the four R pixels of 2×2 to the MUX 51 via the vertical signal lines 9A and 9C, and outputs the accumulated charges of the four G pixels of 2×2 to the MUX 51 via the vertical signal lines 9B and 9D.

The MUX 51 adds the pixel signal of the R pixel from the vertical signal line 9A and the pixel signal of the R pixel from the vertical signal line 9C among the four vertical signal lines 9A to 9D of the phase difference pixel unit 31A, and outputs the result to the ADC 52A, for example. Further, the MUX 51 adds the pixel signal of the G pixel from the vertical signal line 9B and the pixel signal of the G pixel from the vertical signal line 9D, and outputs the result to the ADC 52D, for example. In each of the vertical signal lines 9A to 9D, pixel signals for two pixels in units of OCL arranged in the vertical direction flow to the MUX 51, and the pixel signals flowing to the two vertical signal lines 9 are added by the MUX 51 and supplied to the ADC 52. As a result, the ADC 52A receives a pixel signal of R pixels of four pixels of 2×2 with units of OCL as one pixel, and the ADC 52D receives a pixel signal of G pixels of four pixels of 2×2 with units of OCL as one pixel.

In reading of the next pixel signal, with units of OCL of the phase difference pixel unit 31A as one pixel, the accumulated charges of the four G1 pixels of 2×2 are output to the MUX 51 via the vertical signal lines 9A and 9C, and the accumulated charges of the four B pixels of 2×2 are output to the MUX 51 via the vertical signal lines 9B and 9D.

The MUX 51 adds the pixel signal of the G1 pixel from the vertical signal line 9A and the pixel signal of the G1 pixel from the vertical signal line 9C among the four vertical signal lines 9A to 9D of the phase difference pixel unit 31A, and outputs the result to the ADC 52A, for example. Further, the MUX 51 adds the pixel signal of the B pixel from the vertical signal line 9B and the pixel signal of the B pixel from the vertical signal line 9D, and outputs the result to the ADC 52D, for example. In each of the vertical signal lines 9A to 9D, pixel signals for two pixels in units of OCL arranged in the vertical direction flow to the MUX 51, and the pixel signals flowing to the two vertical signal lines 9 are added by the MUX 51 and supplied to the ADC 52. As a result, a pixel signal of G1 pixels of four pixels of 2×2 with units of OCL as one pixel is input to the ADC 52A, and a pixel signal of B pixels of four pixels of 2×2 with units of OCL as one pixel is input to the ADC 52D.

Figure 12:
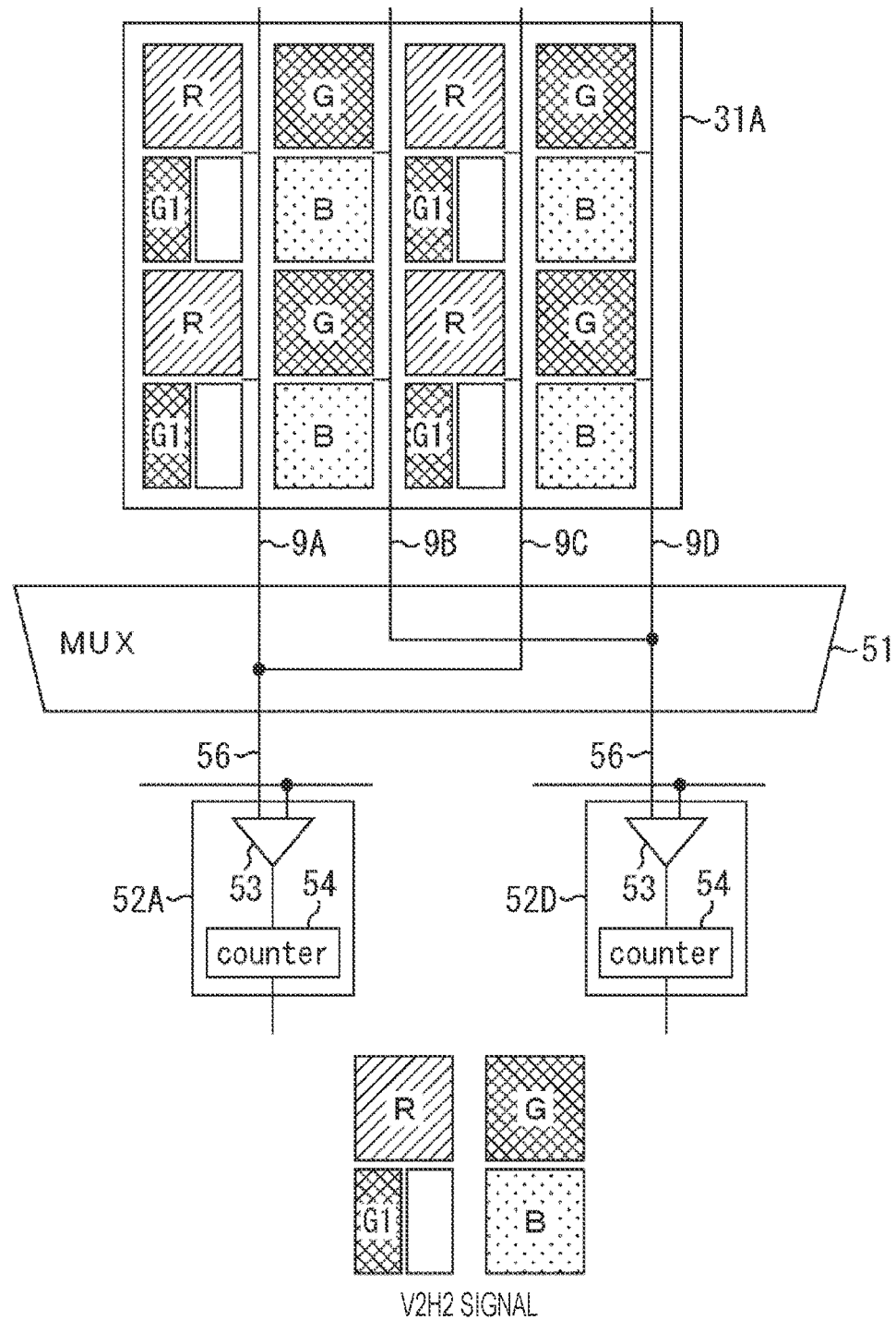
FIG. 12 is a diagram for describing the processing of the column AD conversion unit in the V2H2 addition mode.

As described above, the pixel signal input to the ADC 52A or the ADC 52D is compared with the ramp signal and converted into the count value, whereby the V2H2 signals of the digital R pixel, G pixel, B pixel, and G1 pixel illustrated in FIG. 12 are generated.

According to the pixel arrangement of the phase difference pixel unit 31A and the phase difference pixel unit 31B described above, it is possible to output the phase difference signal even in a case where the pixel signal in which units of OCL is one pixel is added by two pixels in each of the vertical direction and the horizontal direction using the V2H2 addition mode. Since the phase difference signal does not use (discards) the signal charge of one half (two pixels) of the four pixels in units of OCL, there may be a case where the signal level of the pixel signal is low. However, by adding the pixel signals of the four pixels in which units of OCL is one pixel according to the V2H2 addition mode, a sufficient signal amount can be secured even when the signal level is low in one OCL unit.

6. Other Arrangement Examples of Phase Difference Pixel

As described with reference to FIGS. 11 and 12, in the phase difference pixel units 31A and 31B, when the phase difference pixels are arranged at the same color position in pixels in units of OCL of 2×2, there is an advantage that the phase difference signal can be obtained even in a case where the units of OCL of 2×2 are added using the V2H2 addition mode.

Meanwhile, since the light receiving region of the phase difference pixel is a half of the normal light receiving region, the phase difference pixel is a defective pixel as a video pixel signal. Therefore, in the output circuit 7 to which the pixel signal after the AD conversion is input, it is necessary to perform processing of correcting the phase difference pixel using the pixel signal of the same color of the peripheral pixels to generate the pixel signal for video.

However, when the phase difference pixels are arranged at positions of the same color of 2×2 in units of OCL pixels as illustrated in FIG. 11, peripheral pixels used to correct the phase difference pixels are also phase difference pixels, and thus a sufficient signal for generating a pixel signal for video cannot be obtained.

Therefore, as another arrangement example of the phase difference pixels, an arrangement example of phase difference pixels suitable for correction for generating a pixel signal for video will be described below.

Figure 13:
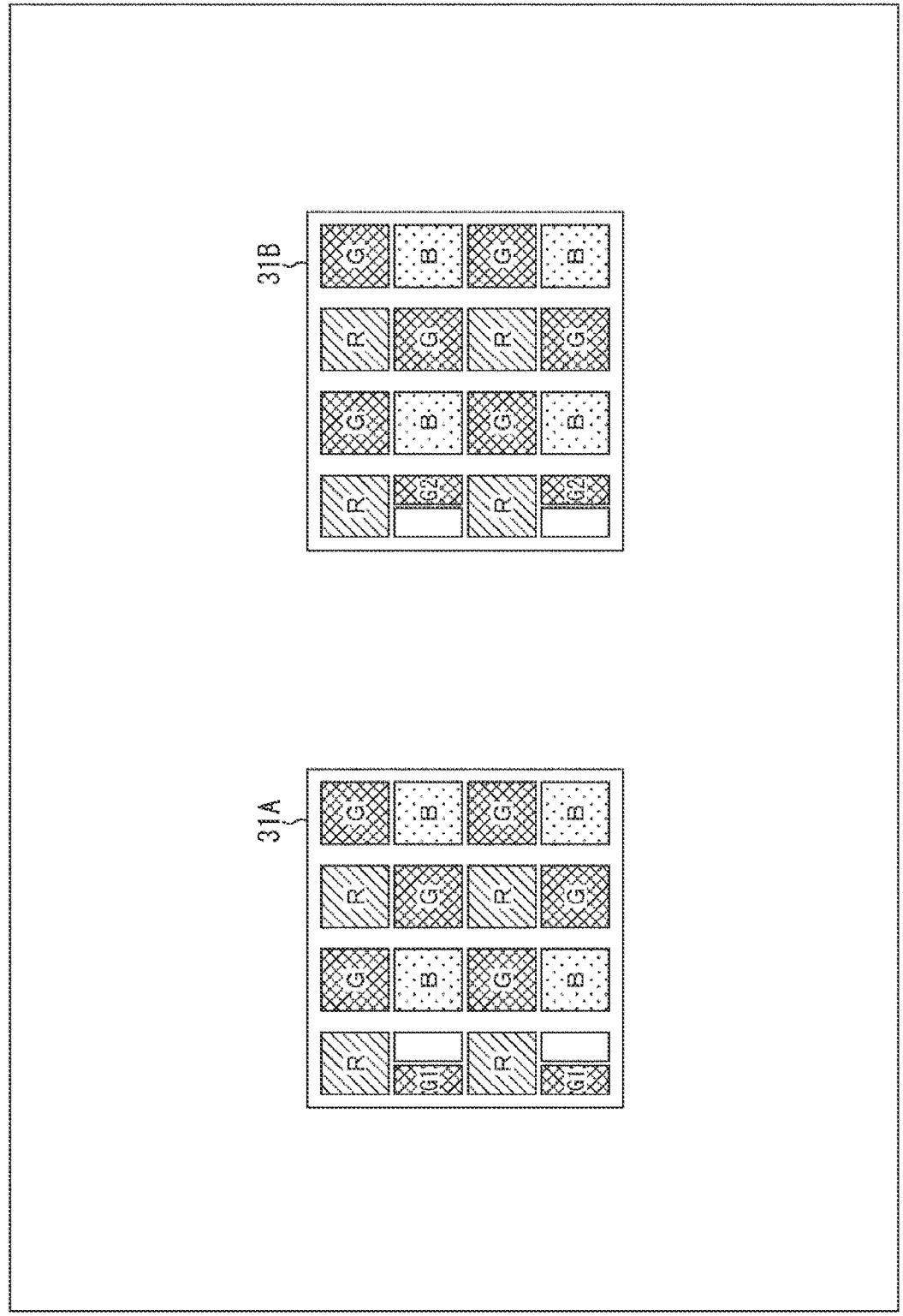
FIG. 13 is a plan view illustrating another arrangement example of the phase difference pixel unit.

FIG. 13 is a plan view illustrating another arrangement example of the phase difference pixel unit.

In the phase difference pixel units 31A and 31B of FIG. 13, the phase difference pixels are arranged only at the positions of the G pixels of two pixels in the vertical direction in pixels in units of OCL. As a result, the number of phase difference pixels in the phase difference pixel units 31A and 31B is changed from 4 to 2, and the number of G pixels that can be used to correct the phase difference pixels increases around the phase difference pixels, so it is possible to obtain a sufficient signal for generating a pixel signal for video.

On the other hand, in the arrangement of FIG. 13, as illustrated in FIG. 11, when the pixel signals of the same color of 2×2 are added in pixels in units of OCL in the V2H2 addition mode, the pixel signal of the phase difference pixel of one half in units of OCL and the pixel signal in units of OCL (four pixels) are added up, and a normal phase difference signal cannot be acquired.

Figure 14:
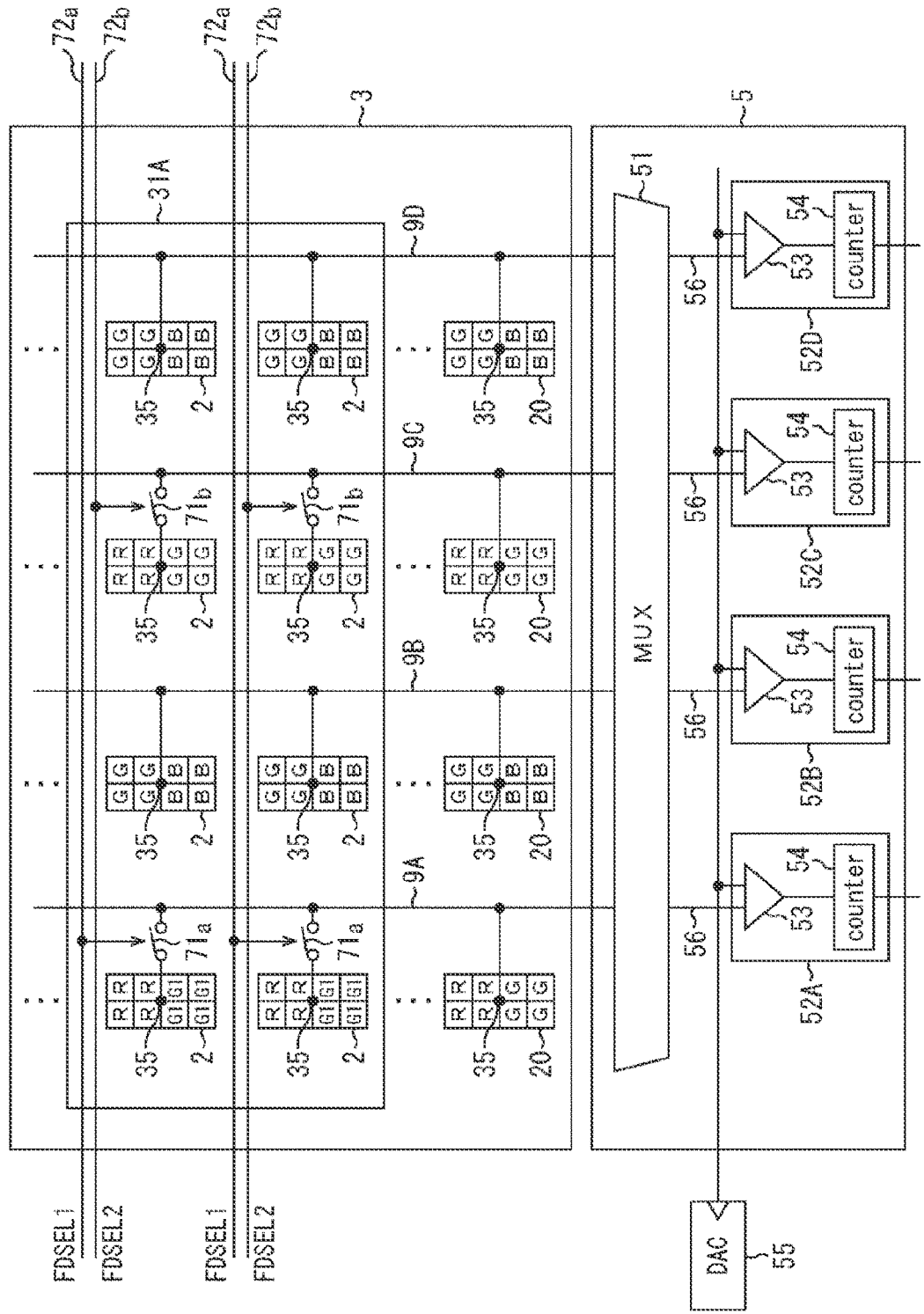
FIG. 14 is a block diagram illustrating configuration examples of a pixel array unit and a column AD conversion unit in a case where the phase difference pixel of FIG. 13 is adopted.

Therefore, in a case where the arrangement of the phase difference pixels illustrated in FIG. 13 is adopted, the circuit configuration illustrated in FIG. 14 is adopted.

FIG. 14 is a block diagram illustrating a configuration example of the pixel array unit 3 and the column AD conversion unit 5 in a case where the arrangement of the phase difference pixels illustrated in FIG. 13 is adopted.

FIG. 14 corresponds to the block diagram of FIG. 10, and the same components as those in FIG. 10 are denoted by the same reference numerals, and the description thereof will be omitted as appropriate.

As compared with the circuit configuration of FIG. 10, in the circuit configuration of FIG. 14, a switch 71 and a signal line 72 are newly added to the portion of the phase difference pixel unit 31A. Specifically, a switch $71_a$ is provided at a connection portion between the pixel circuit of the FD sharing unit including the R pixel and the G1 pixel and the vertical signal line 9, and a switch $71_b$ is provided at a connection portion between the pixel circuit of the FD sharing unit including the R pixel and the G pixel and the vertical signal line 9.

The switch 71 includes, for example, an N-type MOS transistor, and controls whether or not to add the pixel signal in units of OCL of the G1 pixel output from the FD sharing unit including the R pixel and the G1 pixel and the pixel signal in units of OCL of the G pixel of the FD sharing unit including the R pixel and the G pixel. The switch $71_a$ is turned on and off in accordance with a control signal FDSEL1 supplied from the vertical drive circuit 4 via a signal line $72_a$. The switch $71_b$ is turned on and off in accordance with a control signal FDSEL2 supplied from the vertical drive circuit 4 via a signal line $72_b$.

In the V2H2 addition mode, the vertical drive circuit 4 turns off the switch $71_b$ in a case of detecting the phase difference, and turns on the switch $71_b$ in a case of not detecting the phase difference. As a result, in the case of detecting the phase difference, the pixel signal in units of OCL of the G1 pixel output from the FD sharing unit including the R pixel and the G1 pixel and the pixel signal in units of OCL of the G pixel in the FD sharing unit including the R pixel and the G pixel are not added up, so a normal phase difference signal can be acquired.

FIG. 14 illustrates a circuit configuration of the phase difference pixel unit 31A in the pixel array unit 3. Similarly, the phase difference pixel unit 31B is provided with the switch 71 and the signal line 72.

Although not illustrated, a switch $71_a$ is provided at a connection portion between the pixel circuit of the FD sharing unit including the R pixel and the G2 pixel and the vertical signal line 9, and a switch $71_b$ is provided at a connection portion between the pixel circuit of the FD sharing unit including the R pixel and the G pixel and the vertical signal line 9. In the V2H2 addition mode, the vertical drive circuit 4 supplies control signals FDSEL1 and FDSEL2 in which the switch $71_a$ of the FD sharing unit including the R pixel and the G2 pixel of the phase difference pixel unit 31B is turned on and the switch $71_b$ of the FD sharing unit including the R pixel and the G pixel of the phase difference pixel unit 31B is turned off.

Note that, in the above description of FIG. 14, an example has been described in which the switch 71 controls whether or not to add the pixel signals in two units of OCL in the horizontal direction, but the switch 71 can also control whether or not to add the pixel signals in two units of OCL in the vertical direction. In this case, one switch 71 of two FD sharing units adjacent in the vertical direction is controlled to be turned on, and the other switch 71 is controlled to be turned off. It is also possible to control whether or not to add pixel signals of two units of OCL (that is, units of OCL of 2×2) in both the horizontal direction and the vertical direction.

The signal lines $72_a$ and $72_b$ provided for each FD sharing unit including the G1 pixel or the G2 pixel may be wired only for the region where the phase difference pixel unit 31A or 31B is arranged, but may be wired to the entire pixel array unit 3 regardless of the presence or absence of the phase difference pixel units 31A and 31B.

7. Configuration Example of Vertically Split Phase Difference Pixel

In the above-described embodiment illustrated in FIGS. 6 to 8 and the like, in a case where the phase difference pixel units 31A and 31B output the phase difference signal, the left and right (horizontally) split phase difference signal of the left half or the right half in units of OCL is configured to be output.

Hereinafter, a configuration will be described in which, in a case where the phase difference pixel units 31A and 31B output the phase difference signal, the up and down (vertically) split phase difference signal of the upper half or the lower half in units of OCL is output.

Figure 15:
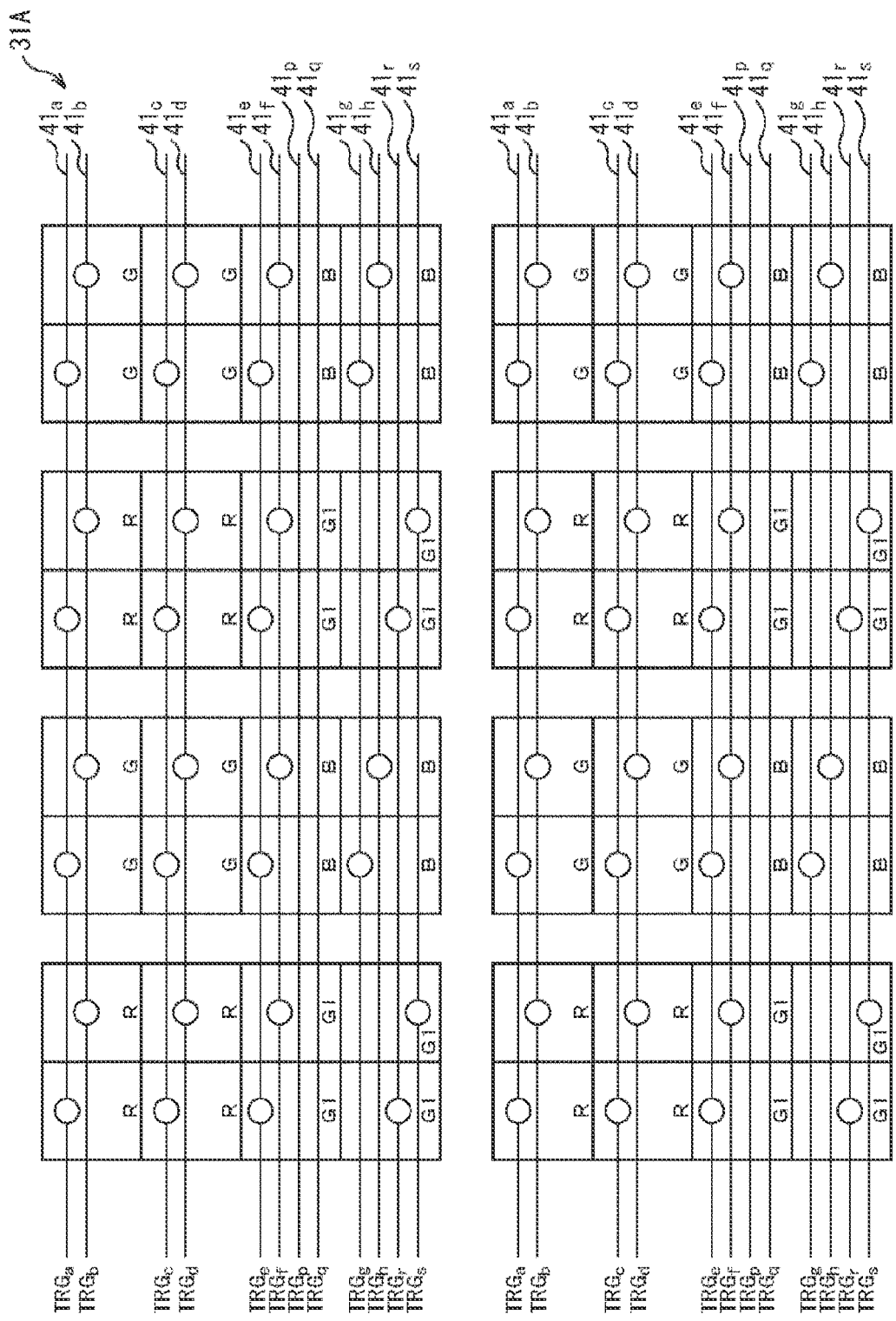
FIG. 15 is a plan view illustrating a wiring example of a signal line of a phase difference pixel unit that outputs a vertically split phase difference signal.

FIG. 15 is a plan view illustrating a wiring example of the signal line 41 of the phase difference pixel unit 31A that outputs the vertically split phase difference signal.

Note that, in the drawings described above, the pixel 2 described as "G1" is a G pixel that can output the phase difference signal of two pixels on the left side, and the pixel 2 described as "G2" is a G pixel that can output the phase difference signal of two pixels on the right side. However, in FIGS. 15 to 18, the pixel 2 described as "G1" is a G pixel that can output the phase difference signal of the upper two pixels, and the pixel 2 described as "G2" is a G pixel that can output the phase difference signal of the lower two pixels.

In the phase difference pixel unit 31A that outputs the horizontally split phase difference signal illustrated in FIG. 6, two signal lines $41_x$ and $41_y$ are added in four rows of the FD sharing unit in addition to the signal lines $41_a$ to $41_h$ of the basic circuit.

On the other hand, in the phase difference pixel unit 31A that outputs the vertically divided phase difference signal illustrated in FIG. 15, four signal lines $41_p$ to $41_s$ are added in four rows of the FD sharing unit in addition to the signal lines $41_a$ to $41_h$ of the basic circuit.

The signal line $41_p$ transmits the drive signal $TRG_p$ to the transfer transistor TG of the predetermined pixel 2 in the GB pixel row. The signal line $41_q$ transmits the drive signal $TRG_q$ to the transfer transistor TG of the predetermined pixel 2 in the GB pixel row. The signal line $41_r$ transmits the drive signal $TRG_r$ to the transfer transistor TG of the predetermined pixel 2 in the GB pixel row. The signal line 41 transmits the drive signal $TRG_s$ to the transfer transistor TG of the predetermined pixel 2 in the GB pixel row. A circle (○) drawn at a predetermined position on the signal line 41 ($41_a$ to $41_h$, $41_p$ to $41_s$) of each pixel 2 represents a contact point between the gate electrode of the transfer transistor TG and the signal line 41.

As indicated by the circles in FIG. 15, the gate electrodes of the transfer transistors TG of the two lower G1 pixels among the four G1 pixels in units of OCL are connected to the signal line $41_r$ or $41_s$ instead of the signal line $41_g$ or $41_h$. Assuming that two B pixels of the GB pixel row in which the four signal lines $41_g$, $41_h$, $41r$, and $41_s$ are arranged are a first pixel and a second pixel, and two G1 pixels are a third pixel and a fourth pixel, the first pixel and the second pixel are controlled by the drive signals TRG of the signal lines $41_q$ and $41_h$, respectively, and the third pixel and the fourth pixel are controlled by the drive signals TRG of the signal lines $41_r$ and $41_s$, respectively.

Figure 16:
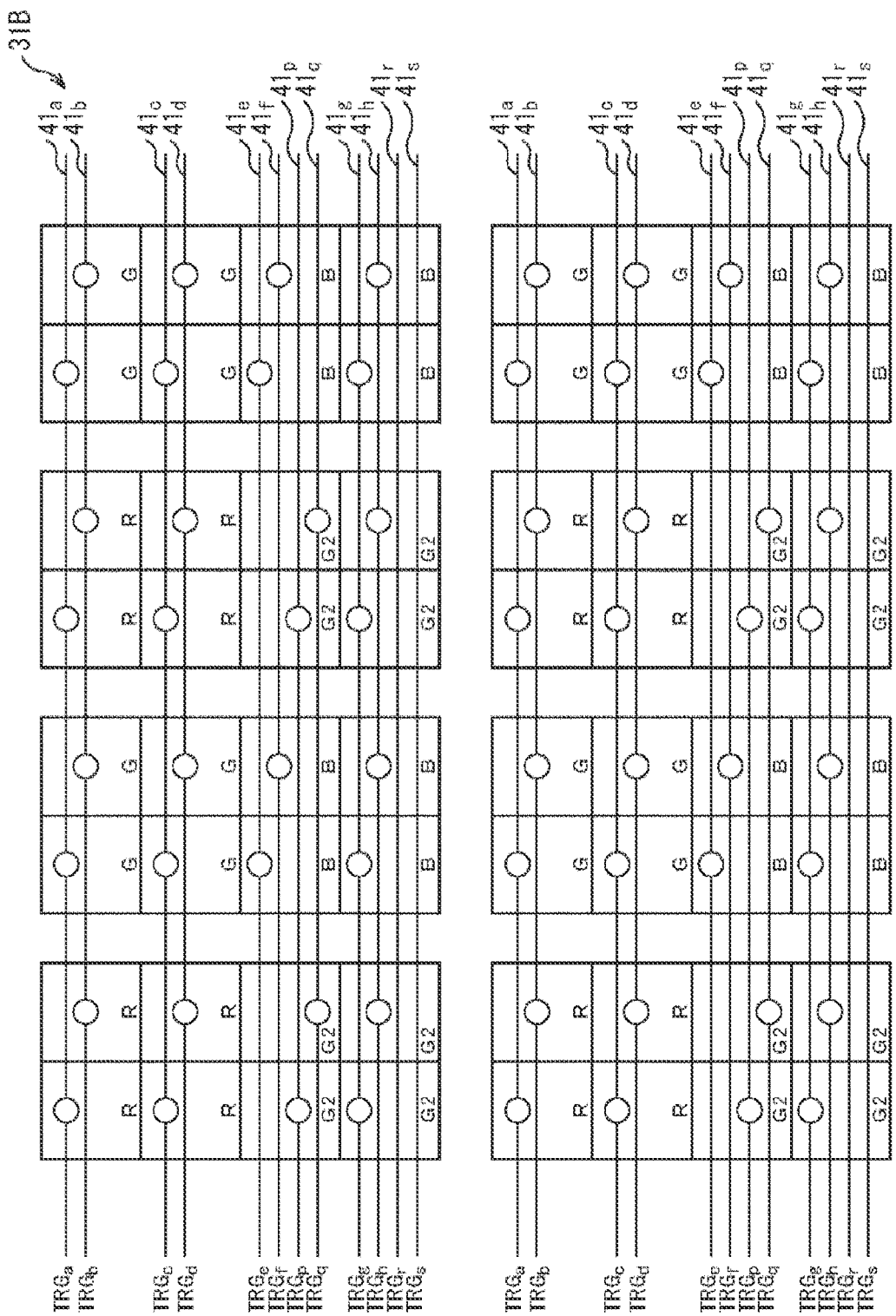
FIG. 16 is a plan view illustrating a wiring example of a signal line of a phase difference pixel unit that outputs a vertically split phase difference signal.

FIG. 16 is a plan view illustrating a wiring example of the signal line 41 of the phase difference pixel unit 31B that outputs the vertically split phase difference signal.

Also in the phase difference pixel unit 31B that outputs the vertically divided phase difference signal illustrated in FIG. 16, four signal lines $41_p$ to $41_s$ are added in four rows of the FD sharing unit in addition to the signal lines $41_a$ to $41_h$ of the basic circuit.

The signal line $41_p$ transmits the drive signal $TRG_p$ to the transfer transistor TG of the predetermined pixel 2 in the GB pixel row. The signal line $41_q$ transmits the drive signal $TRG_q$ to the transfer transistor TG of the predetermined pixel 2 in the GB pixel row. The signal line $41_r$ transmits the drive signal $TRG_r$ to the transfer transistor TG of the predetermined pixel 2 in the GB pixel row. The signal line $41_s$ transmits the drive signal $TRG_s$ to the transfer transistor TG of the predetermined pixel 2 in the GB pixel row. A circle (o) drawn at a predetermined position on the signal line 41 ($41_a$ to $41_h$, $41_p$ to $41_s$) of each pixel 2 represents a contact point between the gate electrode of the transfer transistor TG and the signal line 41.

The phase difference pixel unit 31B in FIG. 16 is different from the phase difference pixel unit 31A in FIG. 15 in that the gate electrodes of the transfer transistors TG of the upper two G2 pixels of the four G2 pixels in units of OCL are connected to the signal lines $41_p$ or $41_q$ instead of the signal lines $41_e$ or $41_f$, and the gate electrodes of the transfer transistors TG of the lower two G2 pixels are connected to the signal lines $41_q$ or $41_h$ instead of the signal lines $41_r$ or $41_s$. Assuming that two B pixels of the GB pixel row in which the four signal lines $41_e$, $41_f$, $41_p$, and $41_q$ are arranged are a first pixel and a second pixel, and two G2 pixels are a third pixel and a fourth pixel, the first pixel and the second pixel are controlled by the drive signals TRG of the signal lines $41_e$ and $41_f$, respectively, and the third pixel and the fourth pixel are controlled by the drive signals TRG of the signal lines $41_p$ and $41_q$, respectively.

Figure 17:
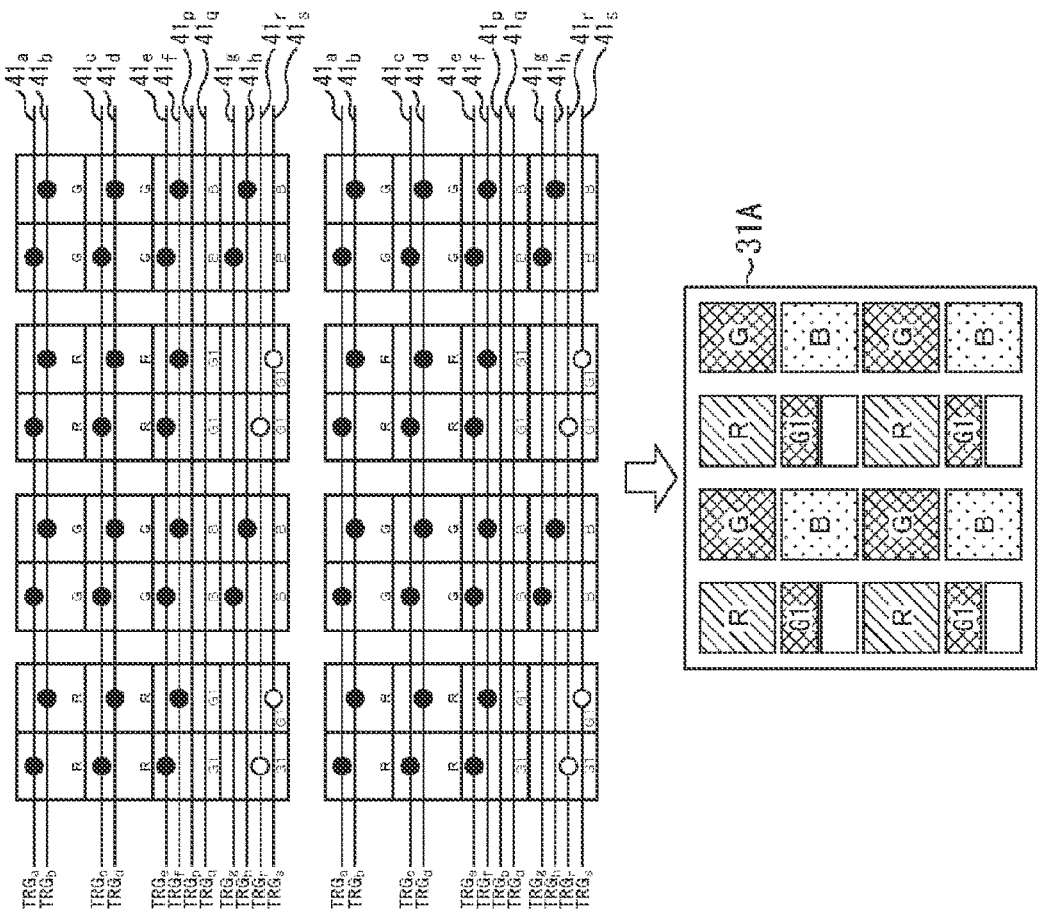
FIG. 17 is a diagram illustrating a driving example of outputting a phase difference signal in a phase difference pixel unit.

FIG. 17 illustrates a driving example of outputting a phase difference signal in the phase difference pixel unit 31A of FIG. 15.

In a case where the phase difference pixel unit 31A of FIG. 15 outputs the phase difference signal, the vertical drive circuit 4 controls the drive signal TRG transmitting the signal line 41 connected to the contact point indicated by the black circle in FIG. 17 to be High.

In the GB pixel row in which four signal lines 41 are wired in one row, the vertical drive circuit 4 controls the drive signals TRG of the upper two signal lines 41, that is, the drive signals $TRG_e$ and $TG_f$ and the drive signals $TRG_g$ and $TG_h$ to be High. As a result, as illustrated in the lower part of FIG. 17, for the G1 pixel, a signal obtained by adding the pixel signals of the two pixels in the upper half in units of OCL can be acquired.

Figure 18:
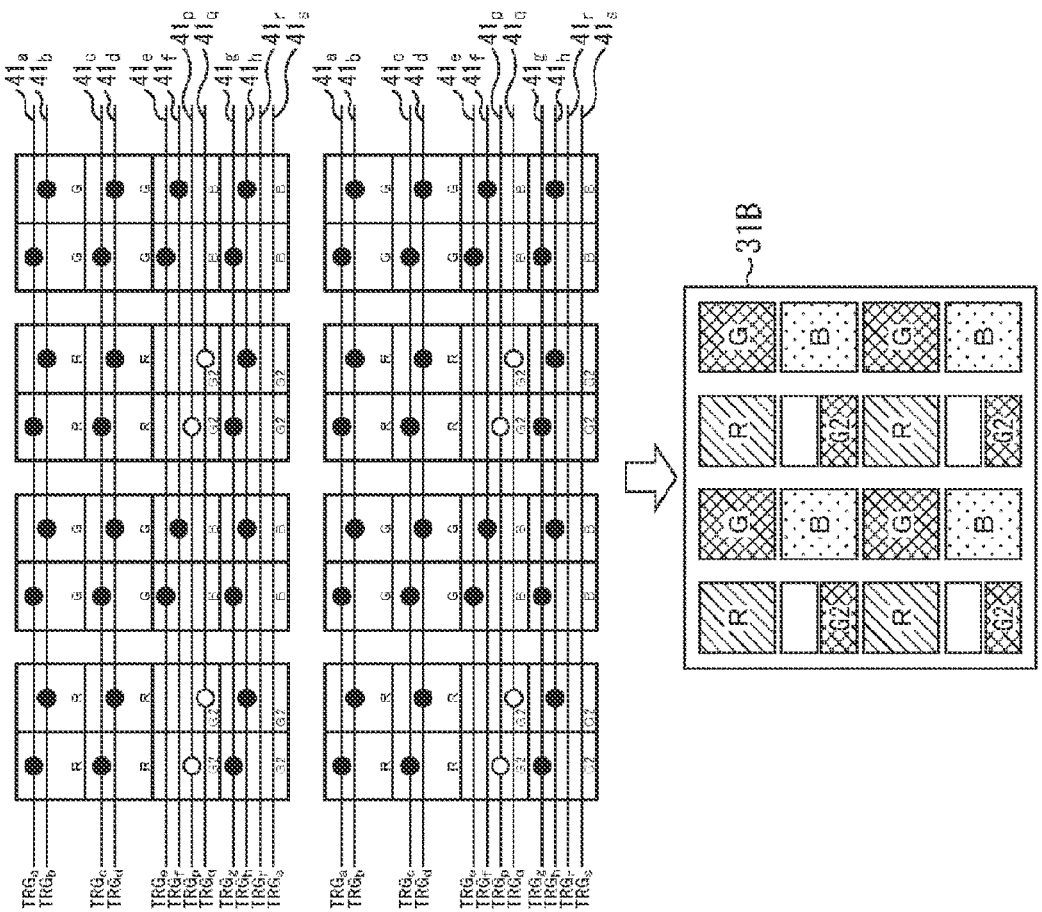
FIG. 18 is a diagram illustrating a driving example of outputting a phase difference signal in a phase difference pixel unit.

FIG. 18 illustrates a driving example of outputting a phase difference signal in the phase difference pixel unit 31B of FIG. 16.

In a case where the phase difference pixel unit 31B in FIG. 16 outputs the phase difference signal, the vertical drive circuit 4 controls the drive signal TRG transmitting the signal line 41 connected to the contact point indicated by the black circle in FIG. 18 to be High.

In the GB pixel row in which four signal lines 41 are wired in one row, the vertical drive circuit 4 controls the drive signals TRG of the upper two signal lines 41, that is, the drive signals $TRG_e$ and $TG_f$ and the drive signals $TRG_g$ and $TG_h$ to be High. As a result, as illustrated in the lower part of FIG. 18, for the G2 pixel, a signal obtained by adding up the pixel signals of the two pixels in the lower half in units of OCL can be acquired.

In a case where the phase difference signal is not output, the four drive signals TRG of the GB pixel row, that is, the drive signals $TRG_e$ to $TRG_h$ and the drive signals $TRG_p$ to $TRG_s$ is only required to be controlled to be High. In this case, it is possible to acquire a pixel signal similar to that of the normal pixel unit 31T obtained by adding up the pixel signals in units of OCLs (four pixels).

That is, the vertical drive circuit 4 of the solid-state imaging device 1 controls all of the drive signals $TRG_e$ to $TRG_h$ and the drive signals $TRG_p$ to $TRG_s$ of the two GB pixel rows to be High and controls all of the transfer transistors $TG_e$ to $TG_h$ to be in the active state in the drive mode (first drive mode) in which the phase difference signal is not output, and controls only the drive signals $TRG_e$ to $TRG_h$ of the two GB pixel rows to be High and controls only the transfer transistors $TG_e$ and $TG_f$ of the upper half in units of OCL or only the transfer transistors $TG_g$ and $TG_h$ of the lower half in units of OCL to be in the active state in the drive mode (second drive mode) in which the phase difference signal is output. As a result, it is possible to output the phase difference signal by performing read operation for each pixel once without lowering the frame rate.

Therefore, according to the configurations of the phase difference pixel units 31A and 31B in FIGS. 15 and 16, it is possible to output the vertically split phase difference signal by reading four pixels in units of OCL once.

Note that the configurations of the phase difference pixel units 31A and 31B in FIGS. 15 and 16 need to be divided into the pixel unit 31 that can output the phase difference signal of the upper half in units of OCL and the pixel unit 31 that can output the phase difference signal of the lower half in units of OCL. However, by connecting the four signal lines 41 of the GB pixel row and the gate electrode of the transfer transistor TG as illustrated in FIG. 19, it is possible to output both the phase difference signal of the upper half and the phase difference signal of the lower half only by controlling the drive signal TRG.

Figure 19:
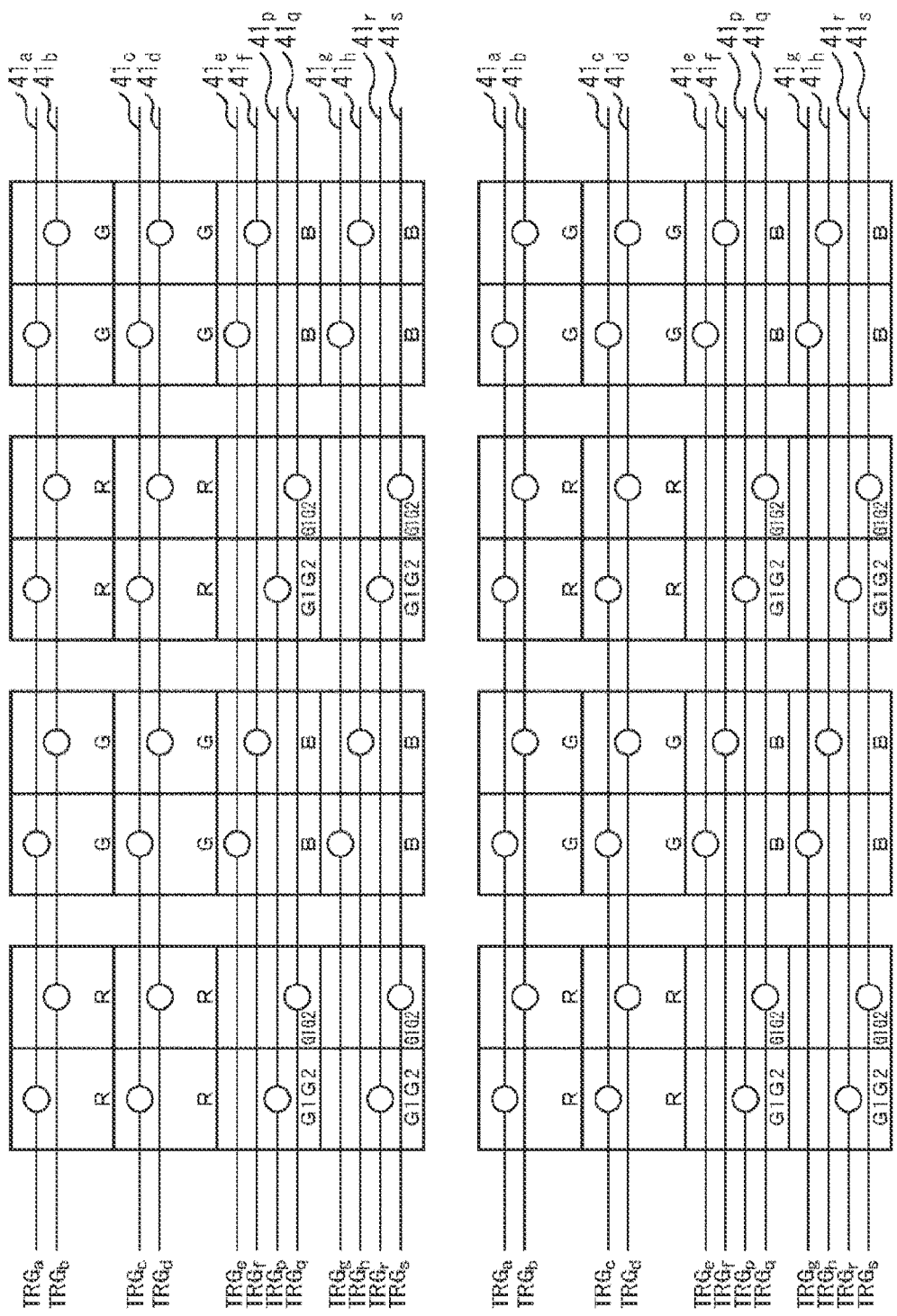
FIG. 19 is a plan view illustrating another wiring example of the signal line of the phase difference pixel unit that outputs the vertically split phase difference signal.

In FIG. 19, the gate electrodes of the transfer transistors TG of the G pixels indicated as "G1G2" are all connected to any of the lower signal lines $41_p$, $41_q$, $41_r$, and $41_s$ among the four signal lines 41 of the GB pixel row. By controlling the drive signals $TRG_p$ and $TRG_q$ to be High and controlling the drive signals $TRG_r$ and $TRG_s$ to be Low, the phase difference signal of the upper half can be acquired. On the other hand, by controlling the drive signals $TRG_p$ and $TRG_q$ to be Low and controlling the drive signals $TRG_r$ and $TRG_s$ to High, the phase difference signal of the lower half can be acquired.

8. Signal Output of Solid-State Imaging Device

The signal output of the solid-state imaging device 1 will be described with reference to FIGS. 20 and 21.

In a solid-state imaging device that does not include the drive signal lines (signal lines $41_x$ and $41_y$) for outputting the phase difference signal as in the solid-state imaging device 1, as described above, it is necessary to perform two read operations of reading the pixel signals of two pixels on either one of the left and right sides and reading the pixel signals in pixels in units of OCL. As a result, although the frame rate decreases, both the pixel signal for video and the pixel signal for phase difference can be acquired in the entire pixel region of the pixel array unit 3 as illustrated in FIG. 20.

Figure 20:
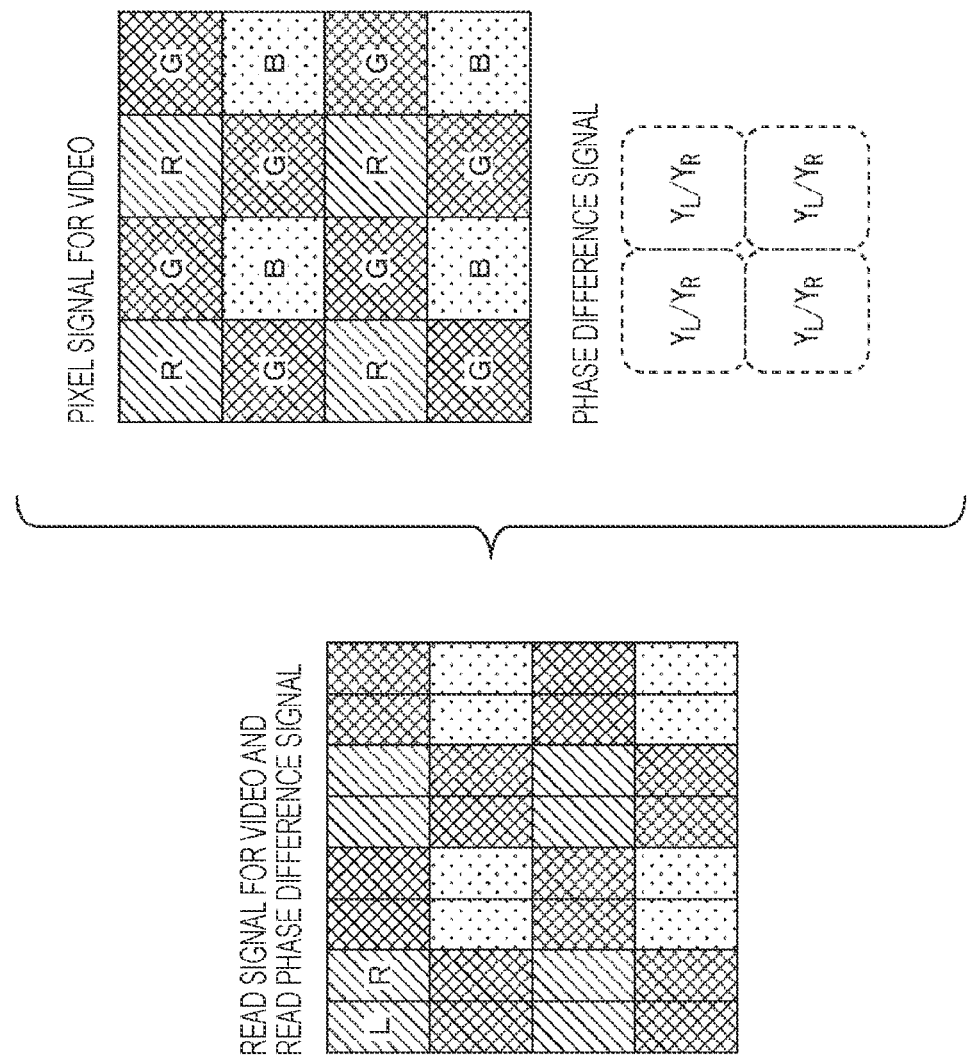
FIG. 20 is a diagram illustrating signal output of the solid-state imaging device.

The example of FIG. 20 illustrates an example in which a pixel signal of each of R, G, G, and B pixels in units of OCL is output as a video pixel signal, and a left phase difference signal $Y_L$ and a right phase difference signal $Y_R$ of a luminance signal Y are calculated and output from phase difference signals of four R, G, G, and B pixels in units of OCL as phase difference pixel signals.

On the other hand, as described above, a part of the entire pixel region of the pixel array unit 3 is set as the pixel signal output for the phase difference, and the solid-state imaging device 1 acquires both the pixel signal for video and the pixel signal for the phase difference by reading once (one frame). A video pixel signal of the phase difference pixel is generated by correction processing.

Figure 21:
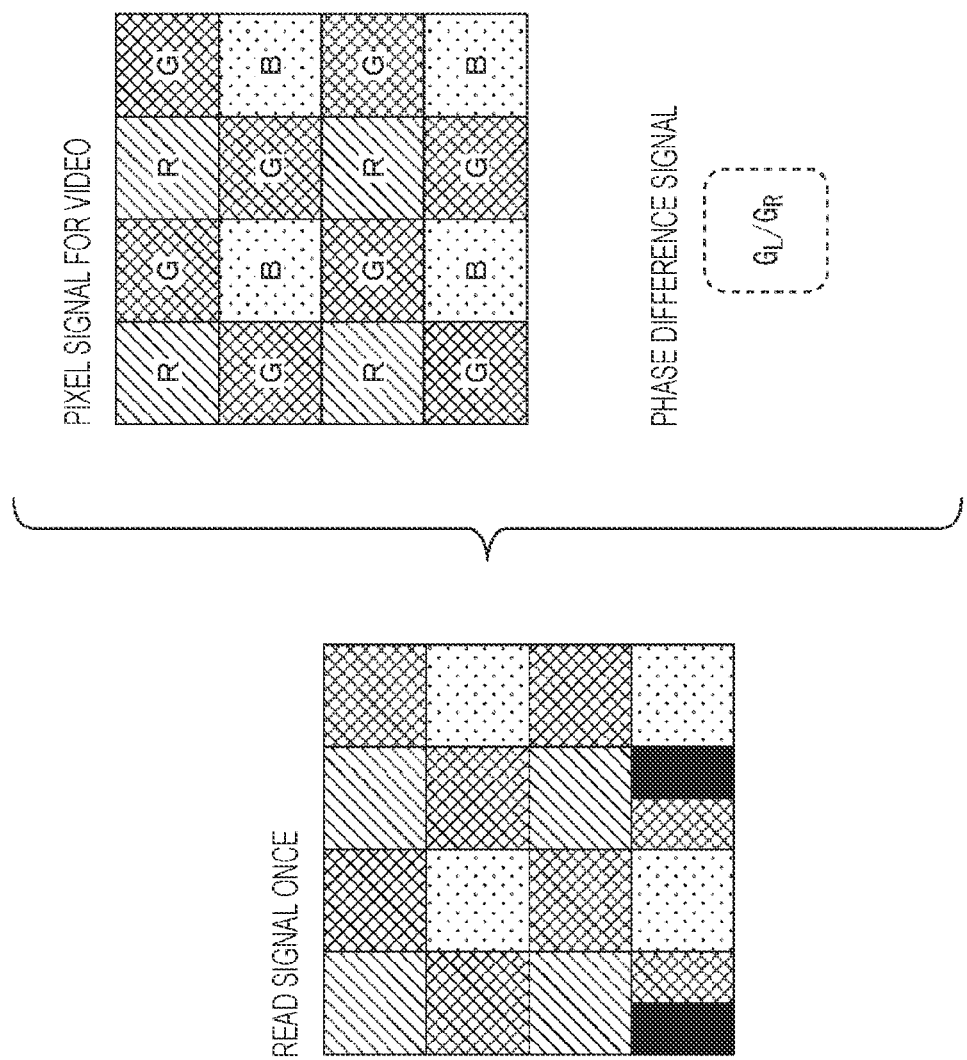
FIG. 21 is a diagram illustrating signal output of the solid-state imaging device.

Therefore, as illustrated in FIG. 21, the solid-state imaging device 1 outputs a pixel signal for video of the entire pixel region of the pixel array unit 3 and a pixel signal for phase difference of only some pixels (phase difference pixels) of the pixel array unit 3. In FIG. 21, since the G pixel is a phase difference pixel, the left phase difference signal $G_L$ and the right phase difference signal $G_R$ of the G pixel are output.

As described above, in a case where the configuration of the present embodiment is used, a smaller number of phase difference signals than the pixel signals for video are output.

9. Others

In the above-described embodiment, as the pixel unit 31 arranged in the pixel array unit 3, the configurations of the phase difference pixel units 31A and 31B that output the phase difference signal of the left half or the right half in units of OCL and the phase difference pixel units 31A and 31B that output the phase difference signal of the upper half or the lower half in units of OCL have been described.

In the pixel array unit 3, the phase difference pixel units 31A and 31B that output the phase difference signal of the left half or the right half and the phase difference pixel units 31A and 31B that output the phase difference signal of the upper half or the lower half in units of OCL can be arranged in a mixed manner.

In the above-described embodiment, the solid-state imaging device 1 has been described as having the shared pixel structure in which one FD 35 is shared by a total of eight pixels of 4×2 as illustrated in FIG. 4. However, the solid-state imaging device 1 may have a structure in which the FD is shared by the number of pixels other than eight pixels (for example, two pixels, four pixels, 16 pixels, and the like), or may have a structure in which the FD and the shared pixel transistor are not shared.

10. Application Example to Electronic Device

The present technology is not limited to application to a solid-state imaging device. That is, the present technology can be applied to all electronic devices using a solid-state imaging device as an image capturing unit (photoelectric conversion unit), such as an imaging device such as a digital still camera or a video camera, a mobile terminal device having an imaging function, and a copying machine using a solid-state imaging device as an image reading unit. The solid-state imaging device may be formed as one chip, or may be in the form of a module having an imaging function in which an imaging unit and a signal processing unit or an optical system are packaged together.

Figure 22:
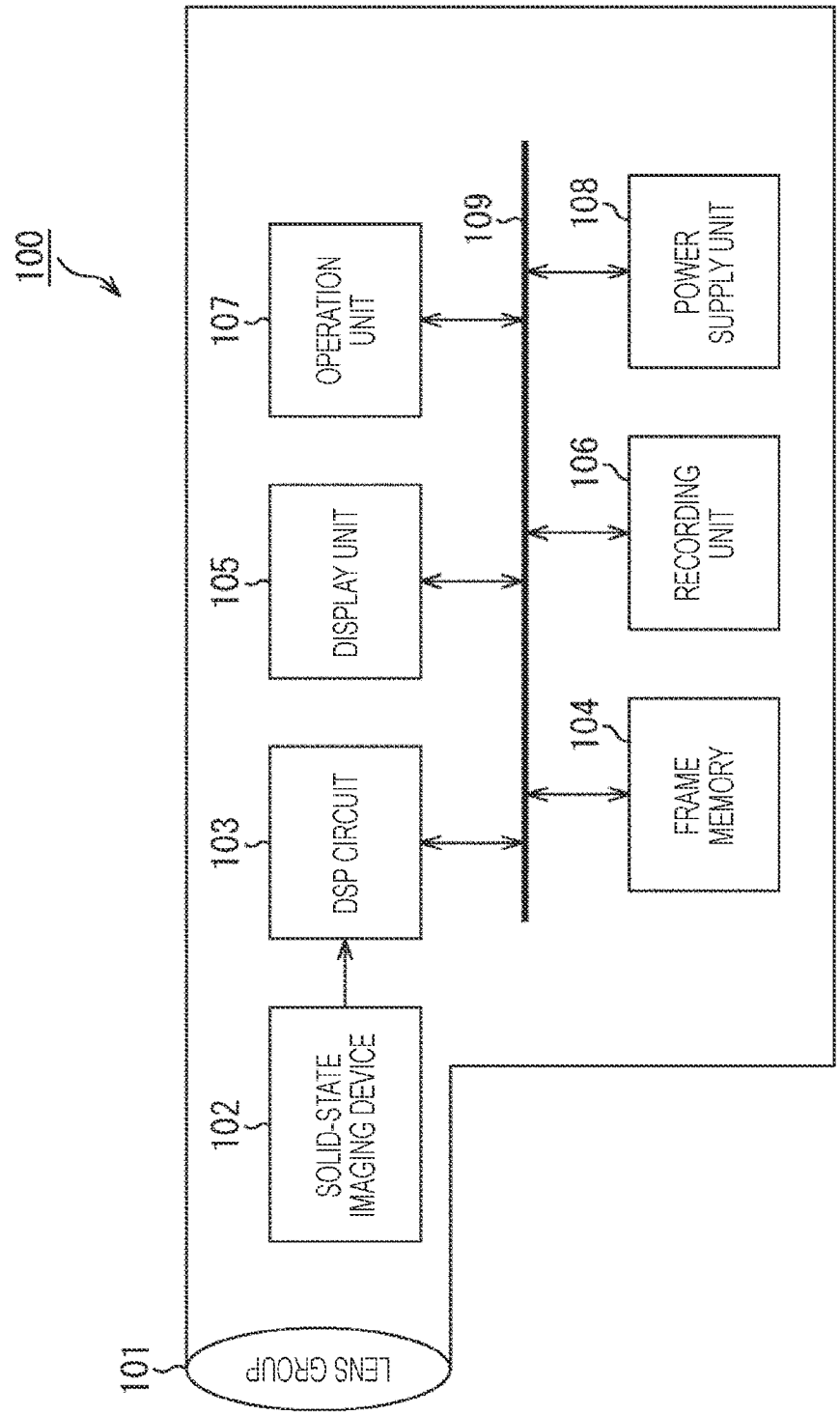
FIG. 22 is a block diagram illustrating a configuration example of an imaging device as an electronic device to which the present technology is applied.

FIG. 22 is a block diagram illustrating a configuration example of an imaging device as an electronic device to which the present technology is applied.

An imaging device 100 in FIG. 22 includes an optical unit 101 including a lens group and the like, a solid-state imaging device (imaging device) 102 in which the configuration of the solid-state imaging device 1 in FIG. 1 is adopted, and a digital signal processor (DSP) circuit 103 that is a camera signal processing circuit. Furthermore, the imaging device 100 also includes a frame memory 104, a display unit 105, a recording unit 106, an operation unit 107, and a power supply unit 108. The DSP circuit 103, the frame memory 104, the display unit 105, the recording unit 106, the operation unit 107, and the power supply unit 108 are connected to one another via a bus line 109.

The optical unit 101 captures incident light (image light) from a subject and forms an image on an imaging surface of the solid-state imaging device 102. The solid-state imaging device 102 converts the light amount of the incident light imaged on the imaging surface by the optical unit 101 into an electrical signal for each pixel and outputs the electrical signal as a pixel signal. As the solid-state imaging device 102, the solid-state imaging device 1 in FIG. 1, that is, a solid-state imaging device capable of simultaneously acquiring a pixel signal for video and a phase difference signal by reading one frame can be used.

The display unit 105 includes, for example, a thin display such as a liquid crystal display (LCD) or an organic electro luminescence (EL) display, and displays a moving image or a still image captured by the solid-state imaging device 102. The recording unit 106 records the moving image or the still image captured by the solid-state imaging device 102 on a recording medium such as a hard disk or a semiconductor memory.

The operation unit 107 issues operation commands for various functions of the imaging device 100 under operation by the user. The power supply unit 108 appropriately supplies various power sources serving as operation power sources of the DSP circuit 103, the frame memory 104, the display unit 105, the recording unit 106, and the operation unit 107 to these supply targets.

As described above, by using the solid-state imaging device 1 to which the above-described embodiment is applied as the solid-state imaging device 102, it is possible to simultaneously acquire the pixel signal for video and the phase difference signal by reading one frame. Therefore, in the imaging device 100 such as a video camera, a digital still camera, or a camera module for a mobile device such as a mobile phone, high-speed focus control and high image quality of a captured image can be achieved.

<Usage Example of Image Sensor>

Figure 23:
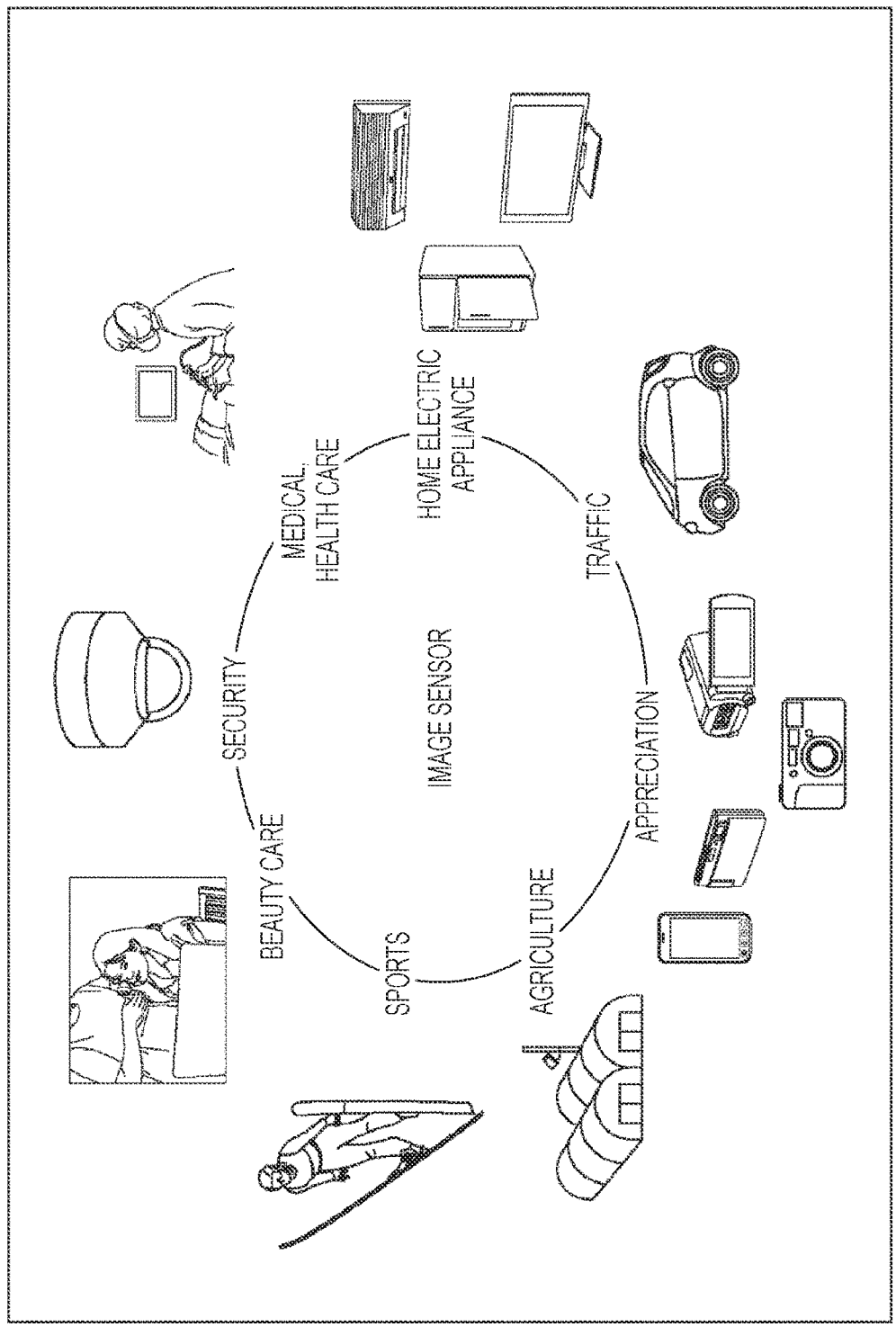
FIG. 23 is a diagram illustrating a usage example of an image sensor.

FIG. 23 is a diagram illustrating a usage example of the solid-state imaging device 1 described above.

The image sensor using the above-described solid-state imaging device 1 can be used, for example, in various cases of sensing light such as visible light, infrared light, ultraviolet light, and X-rays as follows.

- A device that captures an image to be used for viewing, such as a digital camera or a portable device with a camera function
- A device used for traffic, such as an in-vehicle sensor that captures images of the front, rear, surroundings, inside, and the like of an automobile for safe driving such as automatic stop, recognition of a driver's condition, and the like, a monitoring camera that monitors traveling vehicles and roads, and a distance measuring sensor that measures a distance between vehicles and the like.
- A device used for home electric appliances such as a TV, a refrigerator, and an air conditioner in order to capture an image of a gesture of a user and perform an apparatus operation according to the gesture
- A device used for medical care or health care, such as an endoscope or a device that performs angiography by receiving infrared light
- A device used for security, such as a monitoring camera for crime prevention or a camera for person authentication
- A device used for beauty care, such as a skin measuring instrument for capturing an image of skin or a microscope for capturing an image of scalp
- A device used for sports, such as an action camera or a wearable camera for sports or the like
- A device used for agriculture, such as a camera for monitoring conditions of fields and crops

11. Application Example to Endoscopic Surgery System

The present technology according to the present disclosure can be applied to various products. For example, the technology according to the present disclosure may be applied to an endoscopic surgical system.

Figure 24:
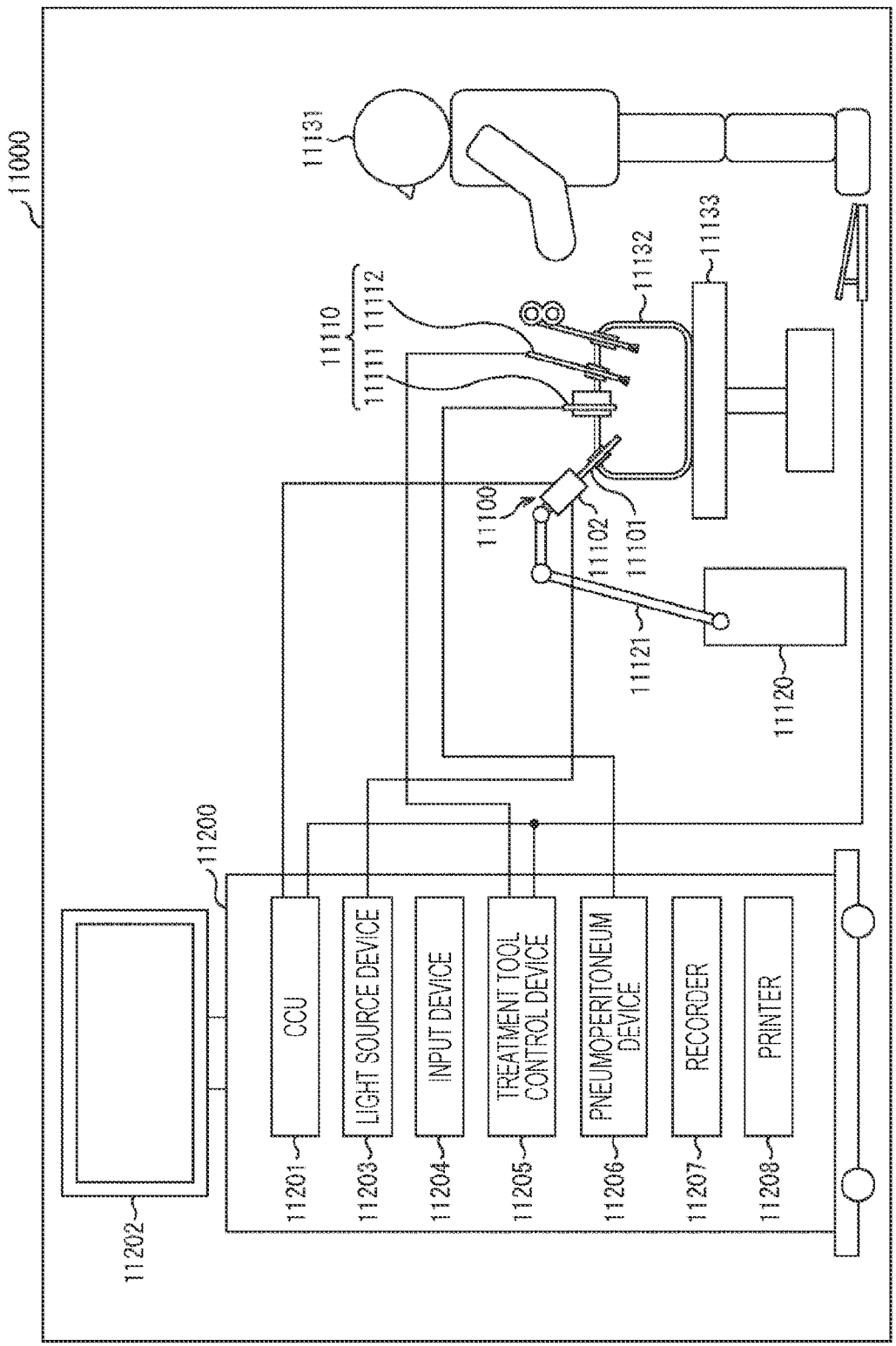
FIG. 24 is a diagram illustrating an example of a schematic configuration of an endoscopic surgery system.

FIG. 24 is a diagram illustrating an example of a schematic configuration of an endoscopic surgery system to which the technology according to the present disclosure (the present technology) can be applied.

FIG. 24 illustrates a state in which an operator (doctor) 11131 is performing surgery on a patient 11132 on a patient bed 11133 using an endoscopic surgery system 11000. As illustrated, the endoscopic surgery system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for endoscopic surgery are mounted.

The endoscope 11100 includes a lens barrel 11101 whose region of a predetermined length from a distal end is inserted into a body cavity of the patient 11132, and a camera head 11102 connected to the proximal end of the lens barrel 11101. In the illustrated example, the endoscope 11100 configured as a so-called rigid scope having the rigid lens barrel 11101 is illustrated, but the endoscope 11100 may be configured as a so-called flexible scope having a flexible lens barrel.

An opening portion into which an objective lens is fitted is provided at the distal end of the lens barrel 11101. A light source device 11203 is connected to the endoscope 11100, and light generated by the light source device 11203 is guided to the distal end of the lens barrel by a light guide extending inside the lens barrel 11101, and is emitted toward an observation target in the body cavity of the patient 11132 via the objective lens. Note that the endoscope 11100 may be a forward-viewing endoscope, an oblique-viewing endoscope, or a side-viewing endoscope.

An optical system and an imaging element are provided inside the camera head 11102, and reflected light (observation light) from the observation target is condensed on the imaging element by the optical system. The observation light is photoelectrically converted by the imaging element, and an electric signal corresponding to the observation light, that is, an image signal corresponding to the observation image is generated. The image signal is transmitted to a camera control unit (CCU) 11201 as RAW data.

The CCU 11201 includes a central processing unit (CPU), a graphics processing unit (GPU), and the like, and integrally controls operation of the endoscope 11100 and the display device 11202. Furthermore, the CCU 11201 receives an image signal from the camera head 11102, and performs various types of image processing for displaying an image based on the image signal, such as development processing (demosaic processing), on the image signal.

The display device 11202 displays an image based on the image signal subjected to the image processing by the CCU 11201 under the control of the CCU 11201.

The light source device 11203 includes a light source such as a light emitting diode (LED), for example, and supplies irradiation light for capturing an image of a surgical site or the like to the endoscope 11100.

The input device 11204 is an input interface for the endoscopic surgery system 11000. The user can input various types of information and instructions to the endoscopic surgery system 11000 via the input device 11204. For example, the user inputs an instruction or the like to change imaging conditions (type, magnification, focal length, and the like of irradiation light) by the endoscope 11100.

A treatment tool control device 11205 controls driving of the energy treatment tool 11112 for cauterization and incision of tissue, sealing of a blood vessel, or the like. A pneumoperitoneum device 11206 feeds gas into the body cavity of the patient 11132 via the pneumoperitoneum tube 11111 in order to inflate the body cavity for the purpose of securing a visual field by the endoscope 11100 and securing a working space of the operator. A recorder 11207 is a device capable of recording various types of information regarding surgery. The printer 11208 is a device capable of printing various types of information regarding surgery in various formats such as text, image, or graph.

Note that the light source device 11203 that supplies the endoscope 11100 with the irradiation light at the time of imaging the surgical site can include, for example, an LED, a laser light source, or a white light source including a combination thereof. In a case where the white light source includes a combination of RGB laser light sources, since the output intensity and the output timing of each color (each wavelength) can be controlled with high accuracy, adjustment of the white balance of the captured image can be performed in the light source device 11203. Furthermore, in this case, by irradiating the observation target with the laser light from each of the RGB laser light sources in a time division manner and controlling the driving of the imaging element of the camera head 11102 in synchronization with the irradiation timing, it is also possible to capture an image corresponding to each of RGB in a time division manner. According to this method, a color image can be obtained without providing a color filter in the imaging element.

Furthermore, the driving of the light source device 11203 may be controlled so as to change the intensity of light to be output every predetermined time. By controlling the driving of the imaging element of the camera head 11102 in synchronization with the timing of the change of the intensity of the light to acquire images in a time division manner and synthesizing the images, it is possible to generate an image of a high dynamic range without so-called blocked up shadows and blown out highlights.

Furthermore, the light source device 11203 may be configured to be able to supply light in a predetermined wavelength band corresponding to special light observation. In the special light observation, for example, so-called narrow band imaging is performed in which a predetermined tissue such as a blood vessel in a mucosal surface layer is imaged with high contrast by irradiating light in a narrower band than irradiation light (that is, white light) at the time of normal observation using wavelength dependency of light absorption in a body tissue. Alternatively, in the special light observation, fluorescence observation for obtaining an image by fluorescence generated by irradiation with excitation light may be performed. In the fluorescence observation, it is possible, for example, to irradiate a body tissue with excitation light to observe fluorescence from the body tissue (autofluorescence observation), or to locally inject a reagent such as indocyanine green (ICG) into a body tissue and irradiate the body tissue with excitation light corresponding to a fluorescence wavelength of the reagent to obtain a fluorescent image, for example. The light source device 11203 can be configured to be able to supply narrow band light and/or excitation light corresponding to such special light observation.

Figure 25:
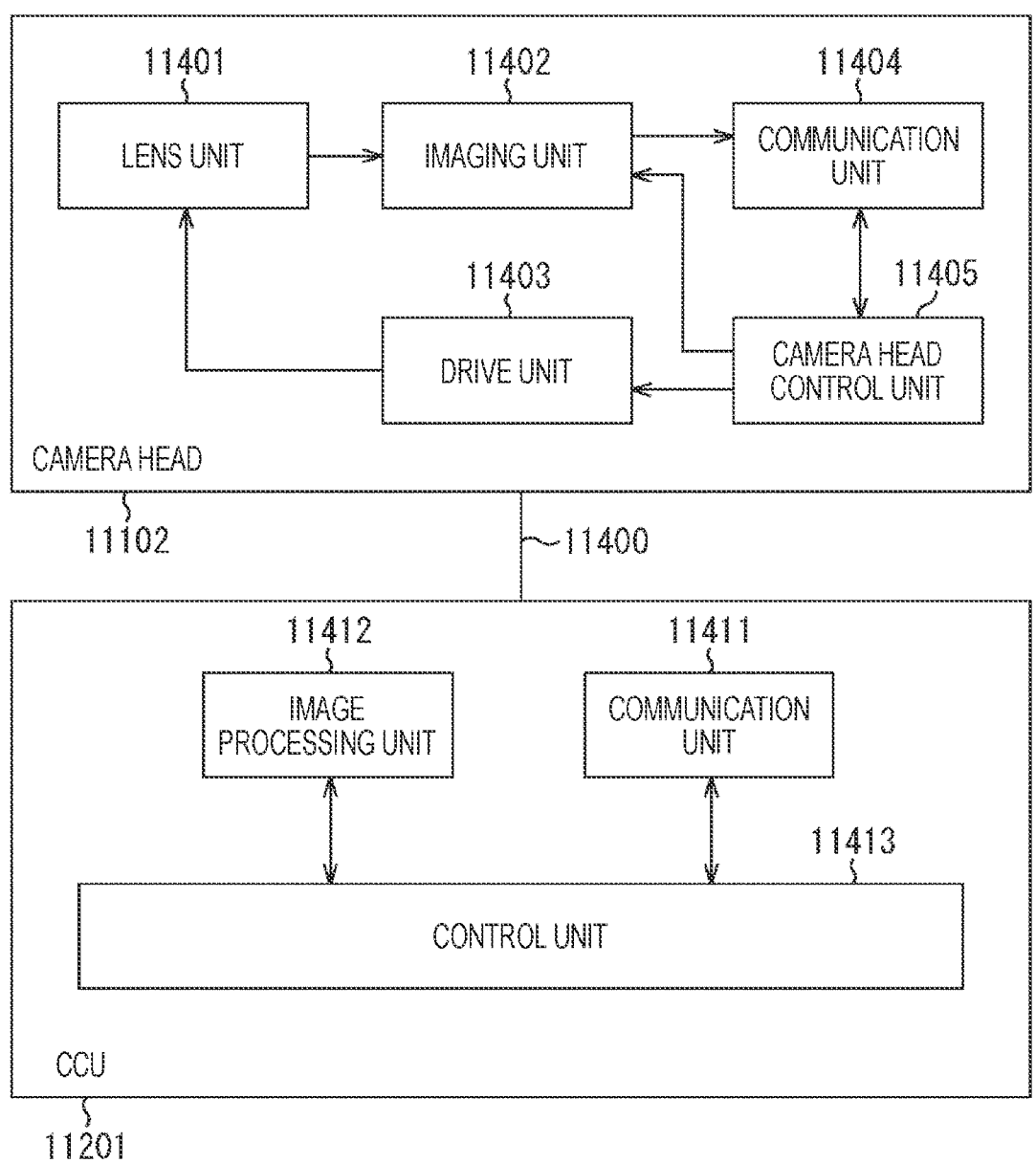
FIG. 25 is a block diagram illustrating an example of functional configurations of a camera head and a CCU.

FIG. 25 is a block diagram illustrating an example of functional configurations of the camera head 11102 and the CCU 11201 illustrated in FIG. 24.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connection portion with the lens barrel 11101. Observation light taken in from the distal end of the lens barrel 11101 is guided to the camera head 11102 and enters the lens unit 11401. The lens unit 11401 is configured by combining a plurality of lenses including a zoom lens and a focus lens.

The imaging unit 11402 includes an imaging element. The number of imaging elements constituting the imaging unit 11402 may be one (so-called single-plate type) or plural (so-called multi-plate type). In a case where the imaging unit 11402 is configured as a multi-plate type, for example, image signals corresponding to RGB may be generated by the respective imaging elements, and a color image may be obtained by combining the image signals. Alternatively, the imaging unit 11402 may include a pair of imaging elements for acquiring right-eye and left-eye image signals corresponding to three-dimensional (3D) display. By performing the 3D display, the operator 11131 can more accurately grasp the depth of the living tissue in the surgical site. Note that, in a case where the imaging unit 11402 is configured as a multi-plate type, a plurality of lens units 11401 can be provided corresponding to the respective imaging elements.

Furthermore, the imaging unit 11402 is not necessarily provided in the camera head 11102. For example, the imaging unit 11402 may be provided immediately after the objective lens inside the lens barrel 11101.

The drive unit 11403 includes an actuator, and moves the zoom lens and the focus lens of the lens unit 11401 by a predetermined distance along the optical axis under the control of the camera head control unit 11405. As a result, the magnification and focus of the image captured by the imaging unit 11402 can be appropriately adjusted.

The communication unit 11404 includes a communication device for transmitting and receiving various types of information to and from the CCU 11201. The communication unit 11404 transmits the image signal obtained from the imaging unit 11402 as RAW data to the CCU 11201 via the transmission cable 11400.

Furthermore, the communication unit 11404 receives a control signal for controlling driving of the camera head 11102 from the CCU 11201, and supplies the control signal to the camera head control unit 11405. The control signal includes, for example, information regarding imaging conditions such as information for specifying a frame rate of a captured image, information for specifying an exposure value at the time of imaging, and/or information for specifying a magnification and a focus of a captured image.

Note that the imaging conditions such as the frame rate, the exposure value, the magnification, and the focus may be appropriately specified by the user, or may be automatically set by the control unit 11413 of the CCU 11201 on the basis of the acquired image signal. In the latter case, a so-called auto exposure (AE) function, an auto focus (AF) function, and an auto white balance (AWB) function are installed in the endoscope 11100.

The camera head control unit 11405 controls driving of the camera head 11102 on the basis of the control signal from the CCU 11201 received via the communication unit 11404.

The communication unit 11411 includes a communication device for transmitting and receiving various types of information to and from the camera head 11102. The communication unit 11411 receives an image signal transmitted from the camera head 11102 via the transmission cable 11400.

Furthermore, the communication unit 11411 transmits a control signal for controlling driving of the camera head 11102 to the camera head 11102. The image signal and the control signal can be transmitted by electric communication, optical communication, or the like.

The image processing unit 11412 performs various types of image processing on the image signal that is RAW data transmitted from the camera head 11102.

The control unit 11413 performs various types of control related to imaging of a surgical site or the like by the endoscope 11100 and display of a captured image obtained by imaging of the surgical site or the like. For example, the control unit 11413 generates a control signal for controlling driving of the camera head 11102.

Furthermore, the control unit 11413 causes the display device 11202 to display a captured image of a surgical site or the like on the basis of the image signal subjected to the image processing by the image processing unit 11412. At this time, the control unit 11413 may recognize various objects in the captured image using various image recognition technologies. For example, the control unit 11413 can recognize a surgical tool such as forceps, a specific body part, bleeding, mist at the time of using the energy treatment tool 11112, and the like by detecting the shape, color, and the like of an edge of an object included in the captured image. When displaying the captured image on the display device 11202, the control unit 11413 may superimpose and display various types of surgery support information on the image of the surgical site by using the recognition result. Since the surgery support information is superimposed and displayed and presented to the operator 11131, the burden on the operator 11131 can be reduced and the operator 11131 can reliably proceed with the surgery.

The transmission cable 11400 connecting the camera head 11102 and the CCU 11201 is an electric signal cable compatible with electric signal communication, an optical fiber compatible with optical communication, or a composite cable thereof.

Here, in the illustrated example, communication is performed by wire using the transmission cable 11400, but communication between the camera head 11102 and the CCU 11201 may be performed wirelessly.

Hereinabove, an example of the vehicle control system to which the technology according to the present disclosure is applied has been described. The technology according to the present disclosure can be applied to the imaging unit 11402 of the camera head 11102 among the above-described configurations. Specifically, the solid-state imaging device 1 can be applied as the imaging unit 11402. By applying the technology according to the present disclosure to the imaging unit 11402, it is possible to simultaneously acquire a pixel signal for video and a phase difference signal. As a result, the captured image with high image quality and distance information can be acquired, and a clearer surgical site image can be obtained.

Note that, here, the endoscopic surgery system has been described as an example, but the technology according to the present disclosure may be applied to, for example, a microscopic surgery system or the like.

12. Application Example to Moving Object

The present technology according to the present disclosure can be applied to various products. For example, the technology according to the present disclosure is realized as a device mounted on any kind of moving bodies such as an automobile, an electric vehicle, a hybrid electric vehicle, a motorcycle, a bicycle, a personal mobility, an airplane, a drone, a ship, and a robot.

Figure 26:
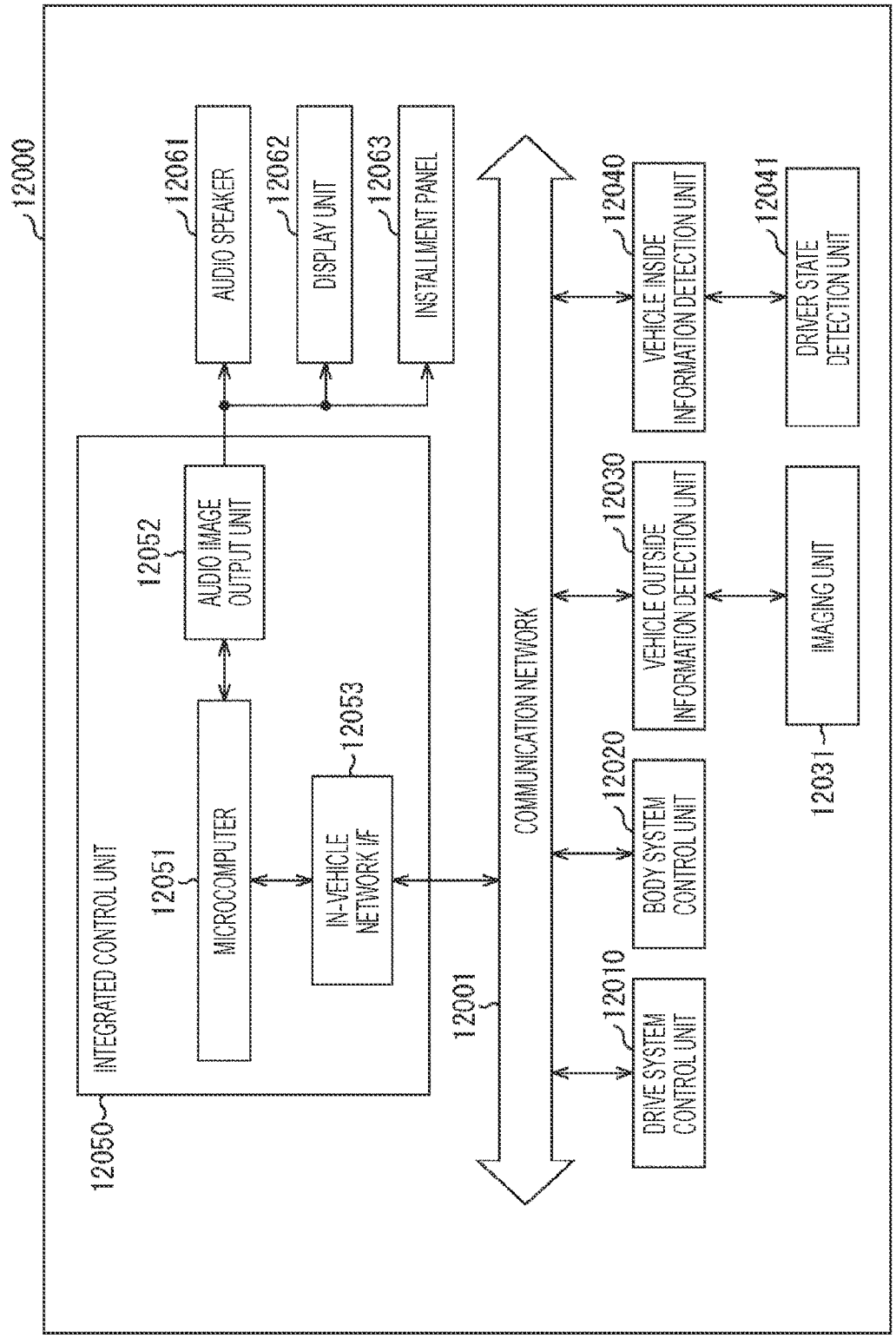
FIG. 26 is a block diagram illustrating an example of the schematic configuration of a vehicle control system.

FIG. 26 is a block diagram illustrating a schematic configuration example of a vehicle control system that is an example of a mobile body control system to which the technology according to the present disclosure can be applied.

A vehicle control system 12000 includes a plurality of electronic control units connected via a communication network 12001. In the example illustrated in FIG. 26, the vehicle control system 12000 includes a drive system control unit 12010, a body system control unit 12020, a vehicle outside information detection unit 12030, a vehicle inside information detection unit 12040, and an integrated control unit 12050. Further, as a functional configuration of the integrated control unit 12050, a microcomputer 12051, an audio image output unit 12052, and an in-vehicle network I/F (interface) 12053 are illustrated.

The drive system control unit 12010 controls an operation of apparatuses related to a drive system of a vehicle according to various programs. For example, the drive system control unit 12010 is a drive force generation apparatus that generates a drive force of a vehicle such as an internal combustion engine or a drive motor, a drive force transmission mechanism that transmits the drive force to wheels, a steering mechanism that adjusts a steering angle of the vehicle, and a control apparatus such as a braking apparatus that generates a braking force of the vehicle.

The body system control unit 12020 controls an operation of various apparatuses mounted on a vehicle body according to various programs. For example, the body system control unit 12020 functions as a keyless entry system, a smart key system, a power window apparatus, or a control apparatus for various lamps such as a head lamp, a back lamp, a brake lamp, a winker, or a fog lamp. In this case, the body system control unit 12020 can be input with radio waves or signals of various switches that are transmitted from a portable device that substitutes a key. The body system control unit 12020 receives the input of these radio waves or signals and controls a door lock apparatus, a power window apparatus, a lamp, and the like of the vehicle.

The vehicle outside information detection unit 12030 detects information outside the vehicle equipped with the vehicle control system 12000. For example, an imaging unit 12031 is connected to the vehicle outside information detection unit 12030. The vehicle outside information detection unit 12030 causes the imaging unit 12031 to capture an image of the outside of the vehicle and receives the captured image. The vehicle outside information detection unit 12030 may perform object detection processing or distance detection processing of a person, a car, an obstacle, a sign, characters on a road surface, or the like on the basis of the received image.

The imaging unit 12031 is an optical sensor that receives light and outputs an electric signal according to a light receiving amount of the light. The imaging unit 12031 can output the electric signal as an image or as distance measurement information. In addition, the light received by the imaging unit 12031 may be visible light or invisible light such as infrared light.

The vehicle inside information detection unit 12040 detects information on an inside of the vehicle. The vehicle inside information detection unit 12040 is connected to, for example, a driver state detection unit 12041 that detects a driver state. The driver state detection unit 12041 includes, for example, a camera that captures a driver, and the vehicle inside information detection unit 12040 may calculate a degree of fatigue or concentration of the driver on the basis of the detection information input from the driver state detection unit 12041 or may determine whether or not the driver is asleep.

The microcomputer 12051 may calculate a control target value of the driving force generation apparatus, the steering mechanism, or the braking apparatus on the basis of the information on the inside and outside of the vehicle acquired by the vehicle outside information detection unit 12030 or the vehicle inside information detection unit 12040, and output a control command to the drive system control unit 12010. For example, the microcomputer 12051 can perform a cooperative control to realize functions of an advanced driver assistance system (ADAS) including collision avoidance or impact mitigation of a vehicle, follow-up traveling based on inter-vehicle distance, vehicle speed maintenance traveling, a collision warning of a vehicle, a lane departure warning of a vehicle, or the like.

Further, the microcomputer 12051 can perform a cooperative control to realize autonomous driving and the like that autonomously travels without depending on the operation of the driver by controlling the driving force generation apparatus, the steering mechanism, the braking apparatus, or the like on the basis of the information around the vehicle acquired by the vehicle outside information detection unit 12030 or the vehicle inside information detection unit 12040.

Further, the microcomputer 12051 can output a control command to the body system control unit 12020 on the basis of the information outside the vehicle acquired by the vehicle outside information detection unit 12030. For example, the microcomputer 12051 can control a head lamp according to a position of a preceding vehicle or an oncoming vehicle detected by the vehicle outside information detection unit 12030, and perform cooperative control to realize anti-glare such as switching a high beam to a low beam.

The audio image output unit 12052 transmits an output signal of at least one of a voice and an image to an output apparatus capable of visually or audibly notifying an occupant of the vehicle or the outside of the vehicle of information. In the example of FIG. 26, an audio speaker 12061, a display unit 12062, and an instrument panel 12063 are exemplified as output devices. The display unit 12062 may include at least one of an onboard display or a head-up display, for example.

Figure 27:
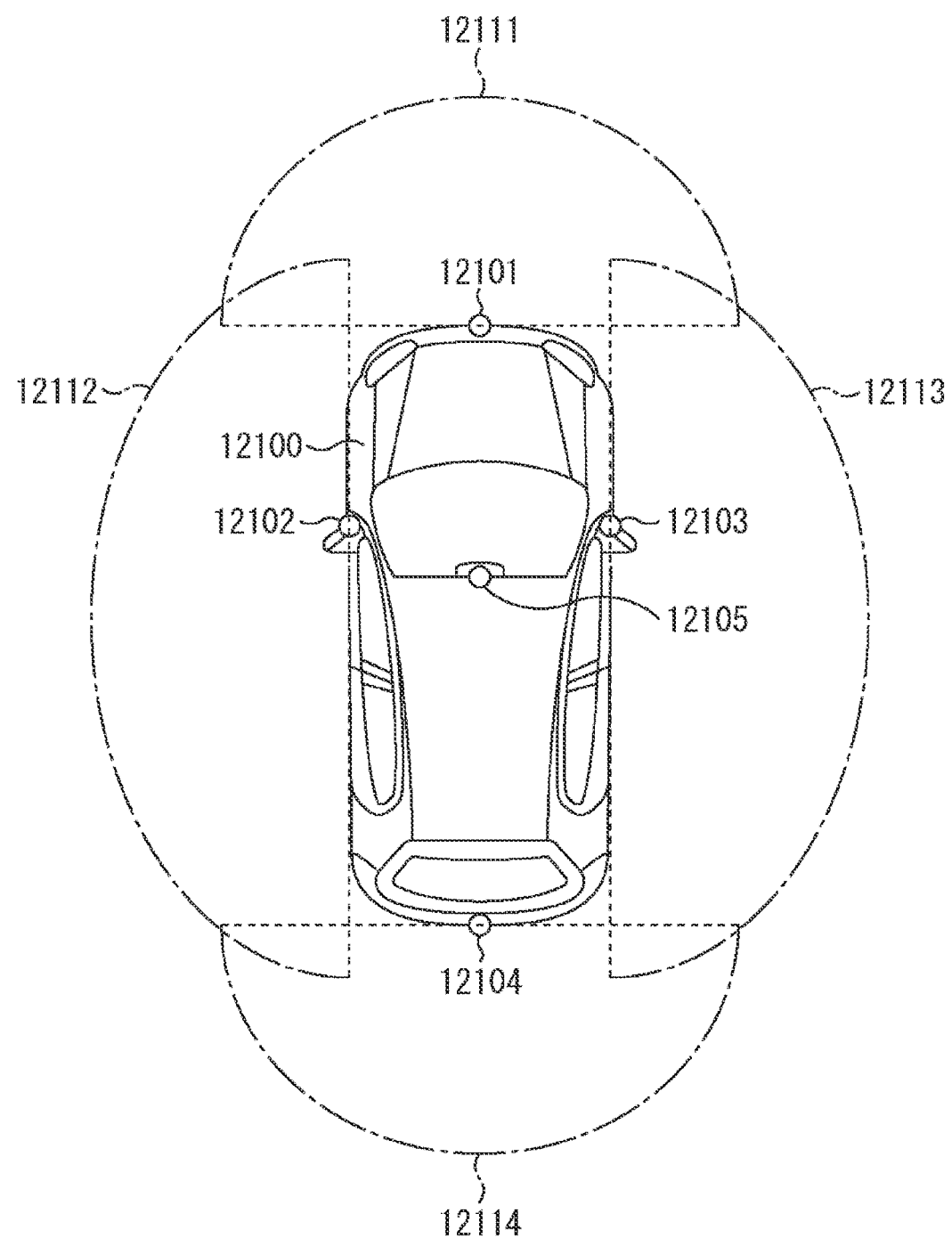
FIG. 27 is an explanatory diagram illustrating an example of installation positions of a vehicle outside information detection unit and an imaging unit.

FIG. 27 is a diagram illustrating an example of an installation position of the imaging unit 12031.

In FIG. 27, the vehicle 12100 has an imaging unit 12101, 12102, 12103, 12104, and 12105 as the imaging unit 12031.

The imaging units 12101, 12102, 12103, 12104, and 12105 are provided at locations such as a front nose, side mirrors, a rear bumper, and a back door of the vehicle 12100 and an upper part of a windshield inside the vehicle, for example. The imaging unit 12101 provided on the front nose and the imaging unit 12105 provided on the upper part of the windshield in the vehicle interior mainly acquire images in front of the vehicle 12100. The imaging units 12102 and 12103 provided on the side mirrors mainly acquire an image of the side of the vehicle 12100. The imaging units 12104 provided on the rear bump or the back door mainly acquire an image of the back of the vehicle 12100. The front images acquired by imaging units 12101 and 12105 are mainly used for detecting a preceding vehicle or a pedestrian, an obstacle, a traffic light, a traffic sign, a lane, or the like.

Note that FIG. 27 illustrates an example of an image capturing range of the imaging units 12101 to 12104. The imaging range 12111 indicates an imaging range of the imaging unit 12101 provided on a front nose, the imaging ranges 12112 and 12113 indicate imaging ranges of the imaging units 12102 and 12103 provided on side mirrors, respectively, and the imaging range 12114 indicates an imaging range of an imaging unit 12104 provided on a rear bumper or a back door. For example, by overlaying the image data captured by the imaging units 12101 to 12104, a bird's-eye view of the vehicle 12100 viewed from above can be obtained.

At least one of the imaging units 12101 to 12104 may have a function of acquiring distance information. For example, at least one of the imaging units 12101 to 12104 may be a stereo camera including the plurality of imaging devices or may be an imaging device having pixels for phase difference detection.

For example, the microcomputer 12051 can extract, in particular, a closest three-dimensional object on a traveling path of the vehicle 12100, that is, a three-dimensional object traveling at a predetermined speed (for example, 0 km/h or more) in a substantially same direction as the vehicle 12100 as a preceding vehicle by obtaining a distance to each three-dimensional object in the imaging ranges 12111 to 12114 and a temporal change (relative velocity with respect to the vehicle 12100) in the distance based on the distance information obtained from the imaging units 12101 to 12104. Furthermore, the microcomputer 12051 can set an inter-vehicle distance to be secured in front of the preceding vehicle in advance, and can perform automatic brake control (including follow-up stop control), automatic acceleration control (including follow-up start control) and the like. In this way, it is possible to perform cooperative control to realize autonomous driving or the like that autonomously travels without depending on an operation of a driver.

For example, the microcomputer 12051 can classify and extract three-dimensional object data regarding a three-dimensional object into two-wheeled vehicles, ordinary vehicles, large vehicles, pedestrians, and other three-dimensional objects such as telephone poles based on the distance information obtained from the imaging units 12101 to 12104, and can be used for automatic avoidance of obstacles. For example, the microcomputer 12051 distinguishes obstacles around the vehicle 12100 into obstacles that the driver of the vehicle 12100 can see and obstacles that are difficult to see. Then, the microcomputer 12051 determines a collision risk which indicates the risk of collision with each obstacle, outputs a warning to a driver via an audio speaker 12061 or a display unit 12062 when there is a possibility of collision that the collision risk exceeds the set value, or performs forced deceleration and avoidance steering through the drive system control unit 12010, thereby performing driving assistance for the collision avoidance.

At least one of the imaging units 12101 to 12104 may be an infrared camera that detects infrared light. For example, the microcomputer 12051 can recognize a pedestrian by determining whether or not the pedestrian exists in the imaged images of the imaging units 12101 to 12104. The recognition of such a pedestrian is performed by, for example, a procedure of extracting the feature points in the imaged image of the imaging units 12101 to 12104 as the infrared camera, and a procedure of determining whether or not there is a pedestrian by performing pattern matching processing on a series of feature points indicating a contour of the object. When the microcomputer 12051 determines that a pedestrian exists in the imaged images of the imaging units 12101 to 12104, and recognizes a pedestrian, the audio image output unit 12052 controls the display unit 12062 so that the recognized pedestrian is overlaid with a rectangular contour line for emphasis. Further, the audio image output unit 12052 may cause the display unit 12062 to display an icon or the like indicating a pedestrian at a desired location.

Hereinabove, an example of the vehicle control system to which the technology according to the present disclosure is applied has been described. The technology according to the present disclosure can be applied to the imaging unit 12031 among the configurations described above. Specifically, the solid-state imaging device 1 according to the above-described embodiment can be applied as the imaging unit 12031. By applying the technology according to the present disclosure to the imaging unit 12031, it is possible to simultaneously acquire a pixel signal for video and a phase difference signal. As a result, it is possible to acquire a high-quality captured image and distance information, and it is possible to increase the safety of the driver and the vehicle.

Note that the embodiment of the present technology is not limited to the above-described embodiment, and various changes can be made without departing from the gist of the present technology.

For example, a form in which all or some of the plurality of embodiments described above are combined can be adopted.

Note that the effects described in the present specification are merely examples and are not limited, and effects other than those described in the present specification may be provided.

Note that the present technology can have the following configurations.

(1)
 A solid-state imaging device including:
  a pixel array unit in which a plurality of pixels in units of microlenses in which color filters of the same color and one microlens are arranged for a plurality of pixels is two-dimensionally arranged in a matrix,
  in which at least some pixel rows of the pixel array unit include:
  a first signal line configured to transmit a drive signal for driving a first transfer transistor of a first pixel in the units of microlenses including a color filter of a first color in the units of microlenses including the color filter of the first color;
  a second signal line configured to transmit a drive signal for driving a second transfer transistor of a second pixel different from the first pixel;
  a third signal line configured to transmit a drive signal for driving a third transfer transistor of a third pixel in units of microlenses including a color filter of a second color different from the first color.

(2)
 The solid-state imaging device according to (1), further including:
  a drive circuit configured to control the transfer transistor,
  in which the drive circuit controls all of the first transfer transistor to the third transfer transistor to be in an active state in a first drive mode, and controls the first transfer transistor and the second transfer transistor to be in an active state in a second drive mode.

(3)
 The solid-state imaging device according to (1) or (2),
  in which the microlens unit is constituted by four pixels including two pixels in each of a vertical direction and a horizontal direction, and the first pixel to the third pixel are in the same pixel row.

(4)
The solid-state imaging device according to (3),
in which a fourth transfer transistor of a fourth pixel different from the third pixel in the units of microlenses including the color filter of the second color is controlled by the drive signal of the first signal line.

(5)
The solid-state imaging device according to (3) or (4),
in which the plurality of pixels in the units of microlenses including the color filter of the second color is pixels that detect a phase difference obtained by horizontally dividing the units of microlenses.

(6)
The solid-state imaging device according to any one of (1) to (5), further including:
a third drive mode in which pixel signals in two units of microlens are added in each of the vertical direction and the horizontal direction.

(7)
The solid-state imaging device according to (6), further including:
a switch configured to control whether or not to add pixel signals in the two units of microlenses in a horizontal direction or a vertical direction in the third drive mode.

(8)
The solid-state imaging device according to (7), further including: a drive circuit configured to control the switch,
in which the drive circuit turns off the switch in a case of detecting a phase difference and turns on the switch in a case of not detecting a phase difference.

(9)
The solid-state imaging device according to (2),
in which at least some pixel rows of the pixel array unit further includes a fourth signal line configured to transmit a drive signal for driving a fourth transfer transistor of a fourth pixel in the units of microlenses including the color filter of the second color, and
the drive circuit controls all of the first transfer transistor to the fourth transfer transistor to be in an active state in the first drive mode, and controls the first transfer transistor and the second transfer transistor to be in an active state in the second drive mode.

(10)
The solid-state imaging device according to (9),
in which the microlens unit is constituted by four pixels of two pixels in each of a vertical direction and a horizontal direction, and the first pixel to the fourth pixel are in the same pixel row.

(11)
The solid-state imaging device according to (9) or (10),
in which the plurality of pixels in the units of microlenses including the color filter of the second color is pixels that detect a phase difference obtained by dividing the microlens unit in the vertical direction.

(12)
The solid-state imaging device according to any one of (1) to (11),
in which the first color is red or blue, and the second color is green.

(13)
A method for driving a solid-state imaging device, including: by the solid-state imaging device including a pixel array unit in which a plurality of pixels in units of microlenses in which color filters of the same color and one microlens are arranged for a plurality of pixels is two-dimensionally arranged in a matrix, and a first signal line to a third signal line in at least some pixel rows of the pixel array unit,
driving a first transfer transistor of a first pixel in the units of microlenses including a color filter of a first color via the first signal line;
driving a second transfer transistor of a second pixel different from the first pixel in the units of microlenses including a color filter of the first color via the second signal line; and
driving, via the third signal line, a third transfer transistor of a third pixel in the units of microlenses including a color filter of a second color different from the first color.

(14)
An electronic device including
a solid-state imaging device including a pixel array unit in which a plurality of pixels in units of microlenses in which color filters of the same color and one microlens are arranged for a plurality of pixels is two-dimensionally arranged in a matrix,
in which at least some pixel rows of the pixel array unit include:
a first signal line configured to transmit a drive signal for driving a first transfer transistor of a first pixel in the units of microlenses including a color filter of a first color;
a second signal line configured to transmit a drive signal for driving a second transfer transistor of a second pixel different from the first pixel in the units of microlenses including the color filter of the first color; and
a third signal line configured to transmit a drive signal for driving a third transfer transistor of a third pixel in the units of microlenses including a color filter of a second color different from the first color.

REFERENCE SIGNS LIST

1 Solid-state imaging device
2 Pixel
3 Pixel array unit
4 Vertical drive circuit
5 Column AD conversion unit
7 Output circuit
8 Control circuit
9 Vertical signal line
10 Pixel drive wiring
31 Comparator
32 UP-down counter
71 AD Converter
72 Reference signal generation unit
100 Imaging device
102 Solid-state imaging device
3, PD Photodiode
35 Floating diffusion (FD)
TG Transfer transistor
TRG Drive signal
26 Microlens
31A, 31B Phase difference pixel unit
31T Normal pixel unit
41 Signal line
51 MUX
52 ADC
53 Comparator
54 Up-down counter
71($71_a$, $71_b$) Switch
72($72_a$, $72_b$) Signal line
100 Imaging device
102 Solid-state imaging device

The invention claimed is:

1. A solid-state imaging device, comprising:
a pixel array including a plurality of pixels arranged in rows and columns, the pixels corresponding to units of microlenses respectively associated with color filters of a same color, wherein
the plurality of pixels includes a first pixel, a second pixel and a third pixel arranged in a first pixel row, the first pixel corresponding to a first microlens associated with a first color, the second pixel corresponding to the first microlens associated with the first color, and the third pixel corresponding to a second microlens associated with a second color different from the first color;
a first signal line configured to transmit a drive signal for driving a first transfer transistor of the first pixel;
a second signal line configured to transmit a drive signal for driving a second transfer transistor of the second pixel;
a third signal line configured to transmit a drive signal for driving a third transfer transistor of the third pixel; and
a drive circuit configured to control the first, second and third transfer transistors,
wherein the drive circuit controls all of the first transfer transistor, the second transfer transistor and the third transfer transistor to be in an active state in a first drive mode, and, among the first through third transfer transistors, controls only the first transfer transistor and the second transfer transistor to be in an active state in a second drive mode.

2. The solid-state imaging device according to claim 1, wherein
a microlens unit is constituted by four pixels including two pixels in each of a vertical direction and a horizontal direction.

3. The solid-state imaging device according to claim 2, wherein
the plurality of pixels includes a fourth pixel corresponding to the second microlens associated with the second color, and a fourth transfer transistor of the fourth pixel is controlled by the drive signal of the first signal line.

4. The solid-state imaging device according to claim 2, wherein
a phase difference is obtained by dividing the units of microlenses in the horizontal direction.

5. The solid-state imaging device according to claim 1, wherein
the plurality of pixels includes a fourth pixel arranged in the first pixel row, the fourth pixel corresponding to the second microlens associated with the second color,
a fourth signal line is configured to transmit a drive signal for driving a fourth transfer transistor of a fourth pixel, and
the drive circuit controls all of the first transfer transistor to the fourth transfer transistor to be in an active state in the first drive mode, and, among the first through fourth transfer transistors, controls only the first transfer transistor and the second transfer transistor to be in an active state in the second drive mode.

6. The solid-state imaging device according to claim 5, wherein
a microlens unit is constituted by four pixels including two pixels in each of a vertical direction and a horizontal direction.

7. The solid-state imaging device according to claim 5, wherein
the plurality of pixels in the units of microlenses including the color filter of the second color is pixels that detect a phase difference obtained by dividing the units of microlenses in a vertical direction.

8. The solid-state imaging device according to claim 1, wherein the first color is red or blue, and the second color is green.

9. An electronic device comprising the solid-state imaging device according to claim 1.

10. A solid-state imaging device, comprising:
a pixel array including a plurality of pixels arranged in rows and columns, the pixels corresponding to units of microlenses respectively associated with color filters of a same color, wherein
the plurality of pixels includes a first pixel, a second pixel and a third pixel arranged in a first pixel row, the first pixel corresponding to a first microlens associated with a first color, the second pixel corresponding to the first microlens associated with the first color, and the third pixel corresponding to a second microlens associated with a second color different from the first color;
a first signal line configured to transmit a drive signal for driving a first transfer transistor of the first pixel;
a second signal line configured to transmit a drive signal for driving a second transfer transistor of the second pixel;
a third signal line configured to transmit a drive signal for driving a third transfer transistor of the third pixel,
wherein, in a drive mode, pixel signals of two units of microlenses are added in each of a vertical direction and a horizontal direction; and
a switch configured to control whether or not to add pixel signals of the two units of microlenses in the horizontal direction or the vertical direction in the drive mode.

11. The solid-state imaging device according to claim 10, further comprising:
a drive circuit configured to control the switch, wherein the drive circuit turns off the switch in a case of detecting a phase difference and turns on the switch in a case of not detecting a phase difference.

12. A method for controlling a solid-state imaging device that includes a pixel array including a plurality of pixels arranged in rows and columns, the pixels corresponding to units of microlenses respectively associated with color filters of a same color, wherein the plurality of pixels includes a first pixel, a second pixel and a third pixel arranged in a first pixel row, the first pixel corresponding to a first microlens associated with a first color, the second pixel corresponding to the first microlens associated with the first color, and the third pixel corresponding to a second microlens associated with a second color different from the first color, the method comprising:
transmitting, by a first signal line, a drive signal for driving a first transfer transistor of the first pixel;
transmitting, by a second signal line, a drive signal for driving a second transfer transistor of the second pixel;
transmitting, by a third signal line, a drive signal for driving a third transfer transistor of the third pixel; and
controlling, by a drive circuit, the first, second and third transfer transistors, wherein among the first, second and third transfer transistors, the drive circuit controls all of the first transfer transistor, the second transfer transistor and the third transfer transistor to be in an active state in a first drive mode, and, among the first through third transfer transistors, controls only the first transfer transistor and the second transfer transistor to be in an active state in a second drive mode.

* * * * *